United States Patent
Teo et al.

(10) Patent No.: US 8,976,556 B2
(45) Date of Patent: Mar. 10, 2015

(54) SPACE VECTOR MODULATION FOR MULTILEVEL INVERTERS

(75) Inventors: Koon Hoo Teo, Lexington, MA (US); Yi Deng, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 414 days.

(21) Appl. No.: 13/547,562

(22) Filed: Jul. 12, 2012

(65) Prior Publication Data

US 2014/0016382 A1    Jan. 16, 2014

(51) Int. Cl.
*H02M 7/493*    (2007.01)

(52) U.S. Cl.
USPC .................................. 363/71; 363/95; 363/123

(58) Field of Classification Search
USPC ......... 363/131, 123, 37, 39, 13, 124, 126, 41, 363/34, 40, 95
See application file for complete search history.

(56) References Cited

U.S. PATENT DOCUMENTS

| | | | |
|---|---|---|---|
| 6,653,812 B1 * | 11/2003 | Huo et al. | 318/801 |
| 7,558,089 B2 | 7/2009 | Mese et al. | |
| 7,710,065 B2 * | 5/2010 | Sato et al. | 318/801 |
| 2006/0245216 A1 * | 11/2006 | Wu et al. | 363/13 |
| 2012/0075892 A1 * | 3/2012 | Tallam et al. | 363/37 |
| 2012/0147639 A1 * | 6/2012 | Mao et al. | 363/98 |

* cited by examiner

*Primary Examiner* — Jeffrey Sterrett
*Assistant Examiner* — Gustavo Rosario Benitez
(74) *Attorney, Agent, or Firm* — Dirk Brinkman; Gene Vinokur

(57) ABSTRACT

Inverter is modulated based on first, second, and third switching states determined according to a reference vector represented as a sum of a remainder vector connecting the reference vector with a first vertex of a modulation triangle and a set of vertex vectors connecting a center vertex of space vector diagram with the first vertex. A first switching state of the inverter at the first vertex is determined based on angles of vertex vectors in the set. A second switching state of the inverter at a second vertex of the modulation triangle and a third switching state of the inverter at a third vertex of the modulation triangle are determined based on the first switching state and the remainder vector.

14 Claims, 21 Drawing Sheets

| Switching State of Each Phase | Corresponding Status of the Switches | | | | | | | |
|---|---|---|---|---|---|---|---|---|
| | $S_1$ | $S_2$ | $S_3$ | $S_4$ | $S_1'$ | $S_2'$ | $S_3'$ | $S_4'$ |
| 4 | 1 | 1 | 1 | 1 | 0 | 0 | 0 | 0 |
| 3 | 0 | 1 | 1 | 1 | 1 | 0 | 0 | 0 |
| 2 | 0 | 0 | 1 | 1 | 1 | 1 | 0 | 0 |
| 1 | 0 | 0 | 0 | 1 | 1 | 1 | 1 | 0 |
| 0 | 0 | 0 | 0 | 0 | 1 | 1 | 1 | 1 |

FIG. 2C

| | 1 | 2 | 3 | 4 | 5 | 6 |
|---|---|---|---|---|---|---|
| *mode*=1 | ABC↑(L) | CAB↓(U) | BCA↑(L) | ABC↓(U) | CAB↑(L) | BCA↓(U) |
| *mode*=2 | CBA↓(U) | BAC↑(L) | ACB↓(U) | CBA↑(L) | BAC↓(U) | ACB↑(L) |

FIG. 5A

| | |
|---|---|
| *mode*=1 | 142 → 141 → 041 → 031 |
| *mode*=2 | 031 → 041 → 141 → 142 |

FIG. 5B

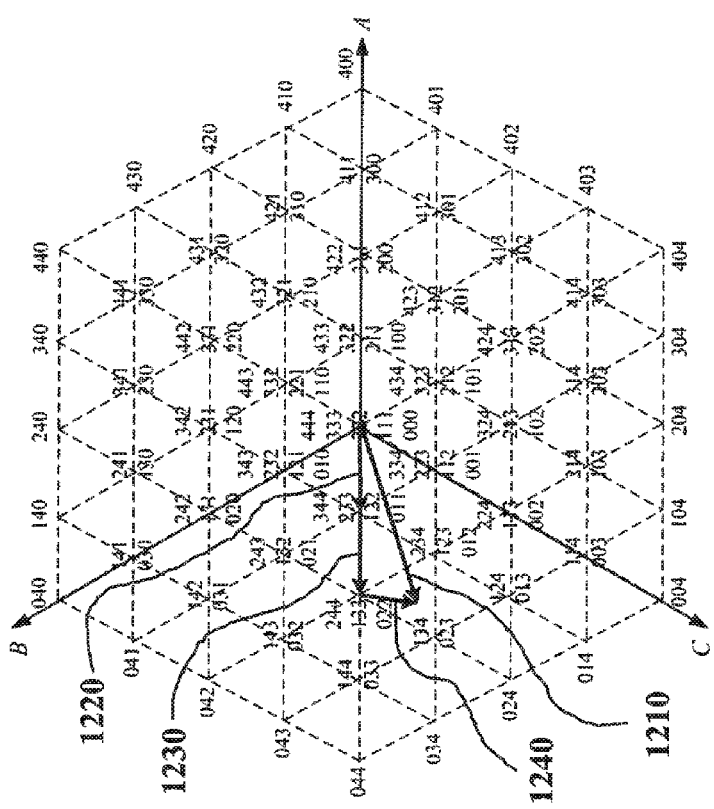

FIG. 13A

| | reg | | | | | |
|---|---|---|---|---|---|---|
| | 1 | 2 | 3 | 4 | 5 | 6 |
| mode=1 | ABC↑CBA↓(L) | CAB↓BAC↑(U) | BCA↑ACB↓(L) | ABC↓CBA↑(U) | CAB↑BAC↓(L) | BCA↓ACB↑(U) |
| mode=2 | CBA↓ABC↑(U) | BAC↑CAB↓(L) | ACB↓BCA↑(U) | CBA↑ABC↓(L) | BAC↓CAB↑(U) | ACB↑BCA↓(L) |

FIG. 13B

| | |
|---|---|
| mode=1 | 022→023→123→133→123→023→022 |
| | 133→134→234→244→234→134→133 |
| | 244→234→134→133→134→234→244 |
| mode=2 | 133→123→023→022→023→123→133 |

SPACE VECTOR MODULATION FOR MULTILEVEL INVERTERS

FIELD OF THE INVENTION

This invention relates generally to electrical power conversion systems, and more space vector modulation for a multilevel inverter based on a space vector diagram of switching states of the inverter.

BACKGROUND OF THE INVENTION

Multilevel inverters are widely used in high-power high-voltage applications due to advantageous performance over two-level inverters, including reduced voltage pressure or tension on the power devices, lower harmonics, lower instantaneous rate of voltage change (dv/dt), and lower common-mode voltage.

Among various modulation strategies for multilevel inverters, space vector pulse width modulation (SVPWM), provides significant flexibility to optimize switching waveforms, and is suitable for implementation in digital signal processors. For an n-level inverter, there are $n^3$ switching states and $6(n-1)^2$ modulation triangles in the space vector diagram. A reference vector defining desired switching state of the inverter can be placed at any modulation triangle of the space vector diagram. To reduce the harmonics and voltage surges during the switching transients, the Nearest Three Vectors (NTV) is commonly adopted. According to the NTV approach, the reference vector of the voltage is equivalent to the nearest three vectors in terms of the average voltage during a switching cycle. However as the level of the inverter increases the increased number of triangles, switching states, and calculation of duty cycles enlarges the complexity of SVPWM for multilevel inverters.

There are two common methods of SVPWM for multilevel inverters. The first method determines the modulation triangle, and then solve three simultaneous equations for that triangle to obtain the duty cycles, see T. Ishida, et al., "A control strategy for a five-level double converter with adjustable dc link voltage," Proc. Ind. Appl. Conf., October 2002, vol. 1, pp. 530-536. The second method determines the modulation triangle, and then uses the particular duty cycle equations pre-stored in the lookup table for this triangle, see S. Mondal, et al., "A neural-network based space-vector PWM controller for a three-level voltage-fed inverter induction motor drive," IEEE Trans. Power Electron., vol. 38, no. 3, pp. 660-669, May/June 2002. However, with the increasing number of levels of the inverter, both of those two methods become intensive in computation.

Several SVPWM based methods are known for three-level inverters. However, those methods are not readily extended to four or higher level inverters. For example, one method partitions the three-level space vector diagram into six two-level space vector diagrams, see H. Zhang, et al., "Multilevel inverter modulation schemes to eliminate common-mode voltages," IEEE Trans. Ind. Appl., vol. 36, no. 6, pp. 1645-1653, November/December 2000. In H. Zhang's method, the axes of the d-q plane are rotated by a certain angle in each calculation of the reference vector location, and no general method for switching sequence selection or application for four or higher level inverter is introduced.

A similar method for three-level inverter is described by J. Seo, et al., "A new simplified space-vector PWM method for three-level inverters," IEEE Trans. Power Electron., vol. 16, no. 4, pp. 545-550, July 2001. In J. Seo's method, a two-phase to three-phase conversion is performed to calculate the shift of origin of a virtual two-level inverter. After the shift of origin and 60° coordinate transformation, duty cycles are calculated using two-level equations. Because of the two-phase to three-phase conversion for each partition of the space vector diagram, the complexity and computation of the method are increased when applied to a four or higher level inverter. Moreover, no general switching sequence selection is used by the method.

A Euclidean vector system based SVPWM is describe by N. Celanovic, et al., "A fast space vector modulation algorithm for multilevel three phase converters," WEE Trans. Ind. Appl., vol. 37, no. 2, pp. 637-641, March/April 2001. However, several matrix transformations are needed, and no systematic approach for determining the switching states or real-time implementation is provided in N. Celanovic's method. A coordinate transformation and switching sequence mapping based SVPWM scheme is described by A. Gupta, et al., "A space vector PWM scheme for multilevel inverters based on two-level space vector PWM," IEEE Trans. Ind. Electron., vol. 53, no. 5, pp. 1631-1639, October 2006. In A. Gupta's method, a coordinate transformation is needed to determine the location of the reference vector and to calculate the duty cycles, and a pre-stored switching sequence mapping table is needed to determine the switching sequence. However, because the number of possible switching sequences increases with the increasing level of the inverter, more memory is needed and slower mapping speed is achieved when A. Gupta's method is applied to higher level inverters.

Accordingly, there is a need for general SVPWM based method for multilevel inverters.

SUMMARY OF THE INVENTION

It is an object of some embodiments to an invention to provide a method for a space vector pulse width modulation (SVPWM) for a multilevel inverter based on a space vector diagram of switching states of the inverter. It is a further objective of some embodiments, to provide a method that avoids a lookup table to increase the flexibility of the SVPWM method for multilevel inverters. It is further objective of some embodiments, to provide a method that can be implemented for inverters of any level.

Some embodiments are based on a realization that a reference vector can be represented as a sum of a remainder vector connecting the reference vector with a first vertex of a modulation triangle enclosing the reference vector, and a set of vertex vectors connecting a center vertex of the space vector diagram with the first vertex.

A "vertex vector" is a vector connecting two adjacent vertices, and a length of the vertex vector can be multiple of $V_{dc}$, which is the voltage of a DC source for the inverter. A sequence of vertex vectors connects the center vertex of the space vector diagram of the multilevel inverter with the first vertex of the modulation triangle enclosing the reference vector. The "remainder vector" is the vector enclosed by the modulation triangle and connecting the first vertex of the modulation triangle with the reference vector.

Some embodiments are based on a further realization that due to construction of the vertex vectors in the space vector diagram, the switching states at the vertices for each vertex vector in the set can be iteratively determined, starting from a current switching state of the inverter at the center vertex, by modifying a corresponding phase of the current switching state. For each iteration, a type of a modification and the corresponding phase can be determined based on a function s of the angle φ of the corresponding vertex vector related to, e.g., axis A of the space vector diagram of the multilevel inverter, and the corresponding phase is increased or decreased by a unit value based on the type of the modification. The unit value can be equal to the multiple of $V_{dc}$ used to construct the space vector diagram. Typically, the unit value and the multiple of $V_{dc}$ is one.

Such realizations allow determining the switching state at the first vertex without using the lookup table, which adds flexibility in designing the inverter of arbitrarily level. Also, knowing the switching state of the first vertex, the switching states of the second and the third vertexes of the modulation triangle enclosing the reference vector can also be determined without the lookup table.

Furthermore, because the remainder vector is inside a hexagon which is a space vector diagram of a two-level inverter, various methods can be reused to determine the duty cycles of the inverter. Moreover, the switching sequence can be determined by calculating the appropriate switching states of the inverter at a second vertex and at a third vertex of the modulation triangle and by selecting the appropriate sequence of the switching states at the three vertices of the modulation triangle. The switching sequence modes can include first mode mode=1 when the switching sequence is counterclockwise selected, and second mode mode=2 when the switching sequence is clockwise selected.

Some embodiments are based on another realization that the relationship between functions of the angles of the vertex and remainder vectors and the type of modification of the corresponding phase can be determining, stored in a memory as predetermined mappings, and reused during the modulation. For example, the function of the angle of the vertex vector can include a ratio of the angle of vertex vector with a minimum angle between two adjacent vertex vectors, e.g., $\pi/3$. The ratio can be mapped to a type of modification of a switching state to produce the first mapping. The type of modification can include increase or decrease of a value of a phase of the switching state by a unit value, e.g., by one.

Similarly, the function of the angle of the remainder vector can determine a region number of the modulation triangle nested in a second-level diagram based on the angle of the remainder vector. The region number can be mapped to the type of modification of the switching state according to a switching sequence mode to produce a second mapping. The first and the second mappings reduces the processing time to switch states, with minimum increase of the memory, while preserving the adaptability to arbitrarily levels of the inverter.

In some embodiments of the invention, the SVPWM controller includes a combination of at least one or multiple modules including a modulation region classifier, a reference vector location generator, a duty cycles generator, and a switching sequence generator. The command reference voltage is at first classified and modified by the modulation region classifier according to the magnitude of the reference voltage. The classified and modified reference voltage is then used by the reference vector location generator to determine the remainder vector $V'_{ref}$, and to determine the switching states at the origin of $V'_{ref}$. Based on $V'_{ref}$ and the command switching frequency, the duty cycles generator determines the value of a region number reg and the duty cycles. The switching sequence generator then produces the switching sequence according to the switching states at the origin of $V'_{ref}$, the region number reg, and the selected switching sequence mode. Finally, the generated switching sequence and the duty cycles are decoded and sent to the inverter as gate driving signals.

In one embodiment, a value of the reference voltage in over-modulation region is modified to achieve the feasibility of the modulation, i.e., a sum of the duty cycles of the switches is smaller than the switching cycle. In another embodiment, the space vector diagram for the reference voltage at a low-modulation range is modified to reduce the number of vertex vectors for locating the reference voltage, which decreases the complexity for determining the switching states.

One embodiment of the invention is extended to produce the switching sequence for other specific requirements. For example, symmetric switching sequence can be generated conveniently. The voltage balance of the DC link capacitors can be controlled by tuning the duty cycles of the zero vectors, or by selecting different redundant switching states and changing the switching sequence in the present invention.

Accordingly, one embodiment of the invention discloses a method for space vector modulation of a multilevel inverter based on a space vector diagram of switching states of the inverter, wherein each switching state defines a combination of phases, wherein the space vector diagram includes a hexagon having a size proportional to a level of the inverter, the hexagon includes a set of vertices uniformly spaced to partition the hexagon into a set of modulation triangles, wherein sides of each modulation triangle are formed by vertex vectors connecting corresponding vertices, wherein the switching states of adjacent vertices are different by a unit value of the phase determined by an angle of the vertex vector connecting the adjacent vertices.

The method includes representing a reference vector as a sum of a remainder vector and a set of vertex vectors connecting a center vertex of the hexagon with a first vertex of the modulation triangle enclosing the reference vector, wherein the remainder vector connects the first vertex with the reference vector; modifying iteratively, for each vertex vector in the set, starting from a current switching state of the inverter at the center vertex, a corresponding phase of the current switching state to produce a first switching state of the inverter at the first vertex, wherein, for each iteration, a type of the modification and the corresponding phase is determined based on a function of the angle of the corresponding vertex vector, and the corresponding phase is increased or decreased by the unit value based on the type of the modification; determining a second switching state of the inverter at a second vertex of the modulation triangle and a third switching state of the inverter at a third vertex of the modulation triangle based on an angle of the remainder vector; and modulating the inverter based on the first, the second, and the third switching states.

Another embodiment discloses a method for a space vector modulation of a multi-level inverter based on a space vector diagram of switching states of the inverter, including representing a reference vector as a sum of a remainder vector connecting the reference vector with a first vertex of a modulation triangle enclosing the reference vector and a set of vertex vectors connecting a center vertex of the space vector diagram with the first vertex; determining a first switching state of the inverter at the first vertex based on angles of vertex vectors in the set and a first mapping between functions of the angles of vertex vectors and types of modification of the switching states; determining a second switching state of the inverter at a second vertex of the modulation triangle and a third switching state of the inverter at a third vertex of the modulation triangle based on the first switching state, the remainder vector and a second mapping of a function of an angle of the remainder vector, switching sequence modes, and the types of modification of the switching states; and modulating the inverter based on the first, the second, and the third switching states.

Yet another embodiment discloses a controller for a space vector modulation of a multi-level inverter based on a space vector diagram of switching states of the inverter. The controller includes a reference vector location generator for determining a first switching state of the inverter at a first vertex based on a set of vertex vectors connecting a center vertex of the space vector diagram with the first vertex of a modulation triangle enclosing the reference vector; a duty cycles generator for determining, based on a remainder vector, a duty cycle and a region number of the modulation triangle nested in a second-level diagram; and a switching sequence generator for determining switching sequence according to the first switching state, the region number, and a switching sequence mode.

BRIEF DESCRIPTION OF THE DRAWINGS

FIGS. 2A-2C are a circuit diagram of single phase circuit topology, space vector diagram, and a table of switching states of a three-phase five-level neutral point clamped inverter, respectively that use embodiments of the invention;

FIG. 5A is a schematic of switching sequence selection method according to some embodiments of the invention;

FIG. 5B is a schematic of illustration of applying the switching sequence selection shown in FIG. 5A to produce switching sequence for the reference vector illustrated in FIG. 3A according to some embodiments of the invention;

FIG. 12A is an example of a reference vector in the low-modulation region according to some embodiments of the invention;

FIG. 12B is an illustration of applying the switching sequence selection method shown in FIG. 5A to generate the switching sequence of the reference vector illustrated in FIG. 12A according to some embodiments of the invention;

FIG. 13A is the switching sequence selection method when symmetric switching sequence is required according to some embodiments of the invention; and FIG. 13B is an illustration of applying the switching sequence selection method shown in FIG. 13A to generate the switching sequence of the reference vector illustrated in FIG. 12A according to some embodiments of the invention.

DETAILED DESCRIPTION OF THE INVENTION

Multilevel inverters are used in high-power medium-voltage applications due to their superior performance compared to two-level inverters. Space vector pulse width modulation (SVPWM) is preferred for various modulation strategies for multilevel inverters because SVPWM offers significant flexibility to optimize switching waveforms, and because SVPWM is well suitable for digital signal processor implementation. In order to reduce the harmonics and voltage surges during the switching transients, the "Nearest Three Vectors" (NTV), is commonly adopted for SVPWM.

For an n-level inverter, however, there are $n^3$ switching states and $6(n-1)^2$ triangles in the space vector diagram. The complexity of conventional SVPWM for multilevel inverters is due to the difficulty in determining the location of the reference vector, the calculation of duty cycles, and the determination and selection of switching states. As the level of the inverter increases, the increased number of switching states, triangles, and calculation of duty cycles adds to the complexity of convention SVPWM for multilevel inverters.

Figure 1:
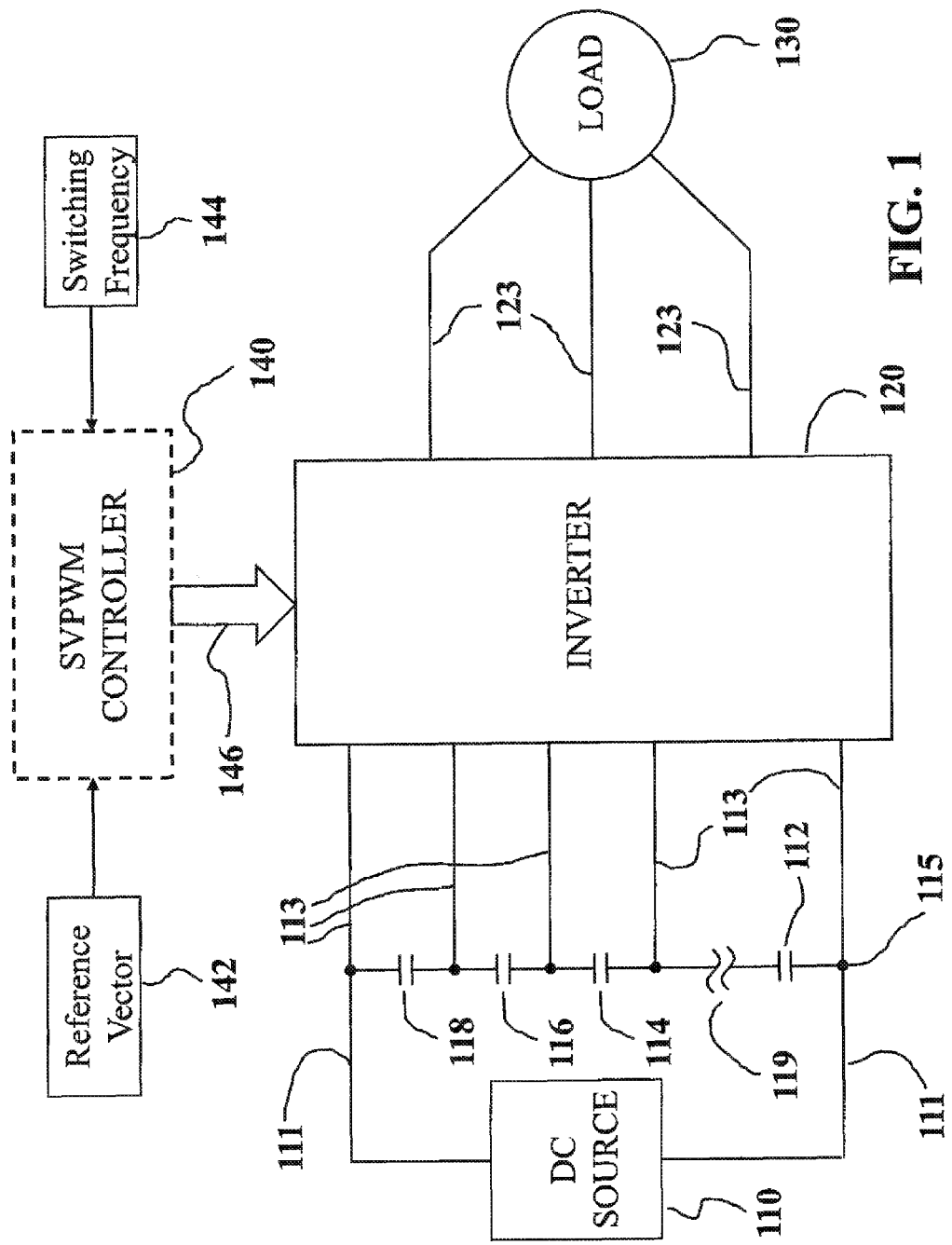
FIG. 1 is a block diagram of a multilevel inverter according to some embodiments of the invention.

FIG. 1 shows an example of a multilevel inverter according to some embodiments of the invention. Voltage of the DC source 110 is supplied on input lines 111 to the capacitors. For an n-level inverter, usually there are (n−1) capacitors preferably, but not necessary, having the same nominal capacitance value. In this example, the capacitors are connected in parallel with the DC source 110. Those capacitors are preferably charged with the same voltage. Only four capacitors 112, 114, 116, and 118 are shown in FIG. 1, and the symbol 119 means all the other capacitors are omitted. The voltages of the capacitors are supplied on input lines 113 to the inverter 120. The inverter 120 provides AC voltage through output lines 123 to the load 130. The gate driving signals 146 of the inverter 120 are produced by the SVPWM controller 140 according to the command reference voltage 142 and the command switching frequency 144.

For an n-level inverter, the output voltage vector is $$V_{out} = V_{dc} \cdot \left(S_a + S_b \cdot e^{j\frac{2}{3}\pi} + S_c \cdot e^{j\frac{4}{3}\pi}\right), \quad (1)$$

where $V_{dc}$ is voltage of the DC source 110, and $S_a$, $S_b$, and $S_c$ are the switching states of phase A, B, and C, respectively. For an n-level inverter, there are n switching states of each phase, which represent n different voltage levels of the phase and the different voltage levels are 0, $V_{dc}/(n-1)$, $2 \cdot V_{dc}/(n-1)$, ... $V_{dc}$ when the voltage of the DC source negative pole 115 is considered as a base. If the value of $S_a$, $S_b$ and $S_c$ are $S_a$, $S_b$, $S_c$=0, 1, ... n−1, then the output voltage of phase A, B, and C are $$\frac{V_{dc}}{n-1} \cdot S_a, \frac{V_{dc}}{n-1} \cdot S_b, \text{ and } \frac{V_{dc}}{n-1} \cdot S_c,$$

respectively.

Figure 2A:
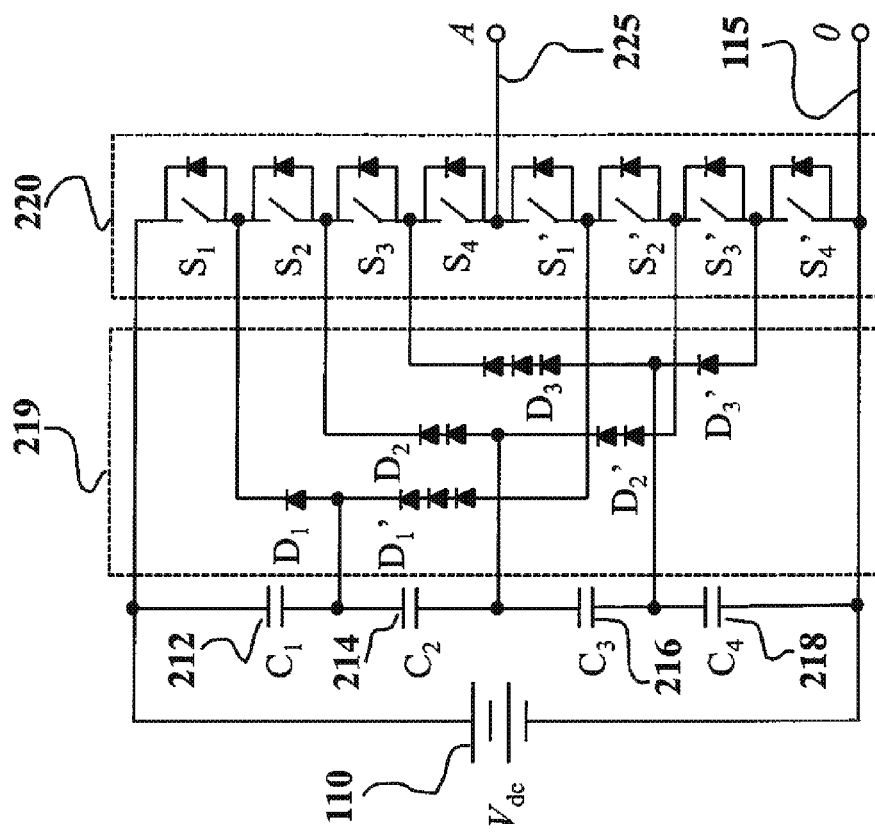
Figure 2B:
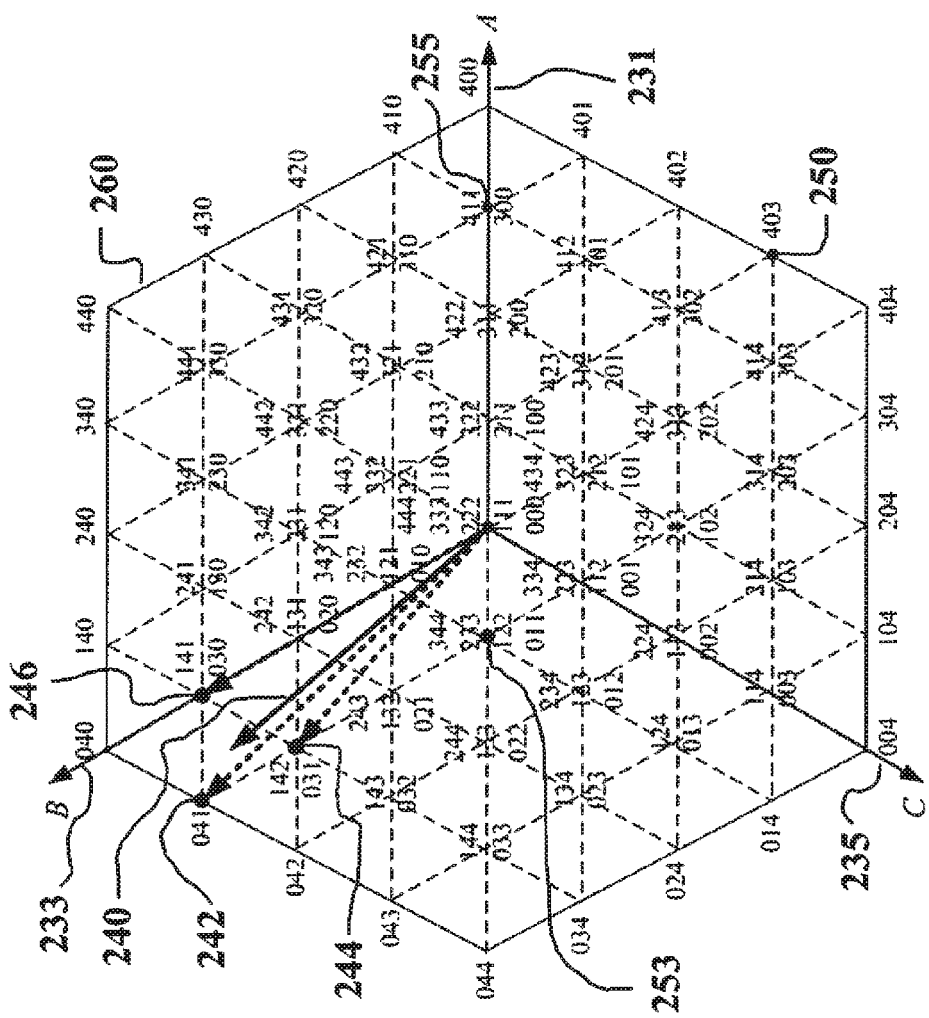

FIGS. 2A-C show an example of a basic circuit structure of one phase of a five-level inverter, and corresponding space vector diagram of switching states, and ON-OFF statuses of the switches. In FIG. 2A, elements 212, 214, 216, and 218 are capacitors and 219 are clamped diodes. The switching state of a phase 225 and the corresponding ON-OFF statuses of the switches 220 are shown in FIG. 2C, where the status 1 means the switch is turned-ON and the status 0 means the switch is turned-OFF.

FIG. 2B shows a space vector diagram of the five-level inverter of FIG. 2A. The space vector diagram includes all possible output voltage vectors and the corresponding switching states of the three phases determined according to Equation (1). The axes A 231, B 233, and C 235 correspond to the three AC output phases. The space vector diagram includes a hexagon 260 having a size proportional to the level of the inverter, and each vertex on and inside the hexagon 260 represents an output voltage vector. The numbers at the vertices on and inside the hexagon 260 denote the switching states combining the three phases. For example, the number at vertex 250 is 403, which means the switching states for phase A, B, and C are 4, 0, and 3, respectively. As can be seen from FIG. 2B, some different switching states, e.g. 411 and 300 at vertex 255, can produce the same three-phase output voltage vector, thus those switching states are redundant switching states. The redundant switching states increase the complexity of conventional SVPWM for multilevel inverters. In the space vector diagram of FIG. 2B, the redundant switching states at each vertex are listed decreasingly from top to bottom according to the switching states of phase A.

The objectives of SVPWM can include finding the nearest three vectors of the reference vector, determining the duty cycles of the nearest three vectors, and selecting the appropriate switching states and switching sequence. For example, some embodiments determine the nearest three vectors $V_{01}$ 242, $V_{02}$ 244, and $V_{03}$ 246 of the reference vector $V_{ref}$ 240 of the vertices 242, 244, and 246. The duty cycles $d_1$, $d_2$, and $d_3$ of the nearest three vectors 242, 244, and 246 can be determined according to $$V_{ref}/f_s = d_1 \cdot V_{01} + d_2 \cdot V_{02} + d_3 \cdot V_{03}, \quad (2)$$

where $f_s$ is the command switching frequency 144. The vertices 242, 244, and 246 form a triangle, which encloses the reference vector 240 and is called the "modulation triangle" in the present invention. The length of each side of each modulation triangle in the present invention is $V_{dc}$, where $V_{dc}$ is the voltage of the DC source 110.

Some embodiments of the invention enable a space vector modulation of a multilevel inverter based on a space vector diagram of switching states of the inverter, such that the modulation does not require lookup tables and is adaptable to any type and level of the inverters. Specifically, the embodiments take advantage of a realization that a reference vector can be represented as a sum of a remainder vector connecting the reference vector with a first vertex of a modulation triangle enclosing the reference vector and a set of vertex vectors connecting a center vertex of the space vector diagram with the first vertex. This realization allows locating a modulation triangle enclosing the reference vector in the space vector diagram, and determining the switching states of the vertexes of that modulation triangle.

Figures 3A, 3B:
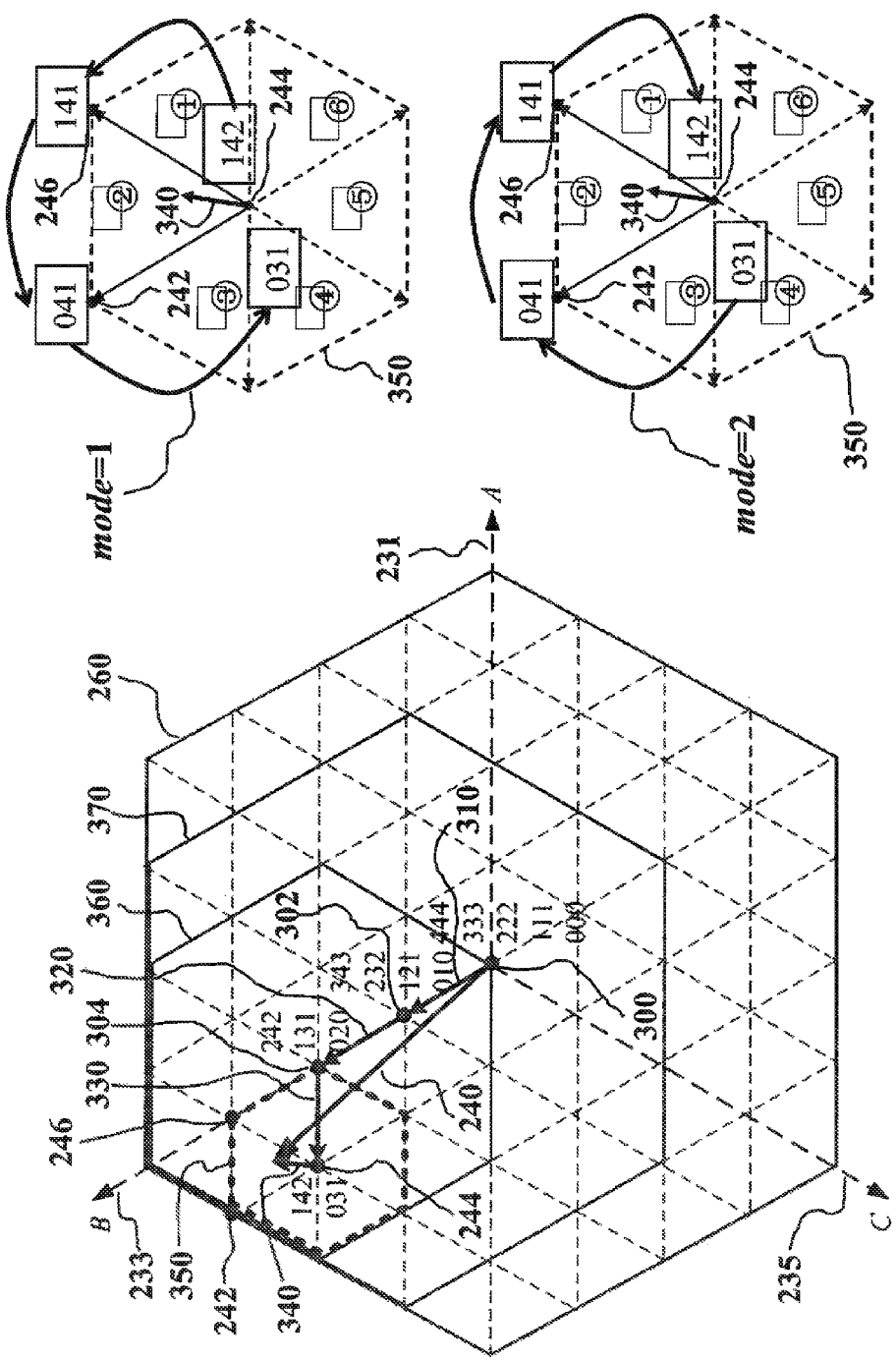
FIG. 3A is a schematic of a location method for the reference vector according to some embodiments of an invention.
FIG. 3B is a schematic of calculation of the duty cycles and selection of the switching sequence according to some embodiments of the invention.
Figure 3C:
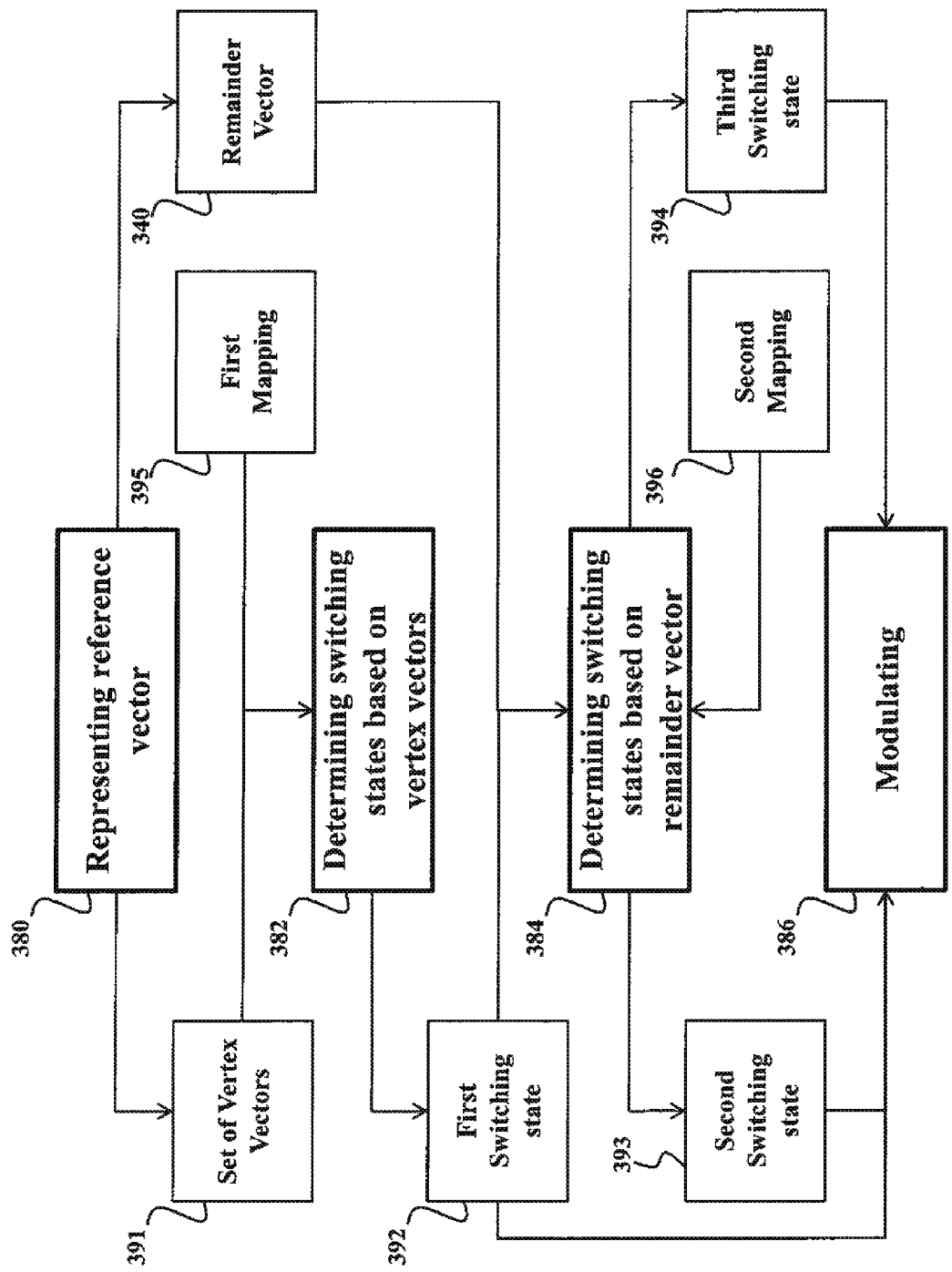
FIG. 3C is a diagram of a modulation method employed by some embodiments of the inventioned.

FIGS. 3A-C schematically show realization and a diagram of a modulation method employed by some embodiments. For purposes of exemplifying the realization, the space vector diagram of a five-level inverter, as shown in FIG. 2B, is used to illustrate the SVPWM method of the embodiments. It is understood that the SVPWM method can be implemented in any level inverters.

The reference vector 240 is represented 380 as a sum of a set 391 of "vertex vectors" 310, 320, and 330 and a "remainder vector" 340. A "vertex vector" 310, 320, or 330 is a vector connecting two adjacent vertices, e.g. the vertex vector 310 connects adjacent vertices 300 and 302, and the length of the vertex vector is multiple of $V_{dc}$, where $V_{dc}$ is the voltage of the DC source 110. The multiple of $V_{dc}$ also defines a unit value of a difference between phases of the switching states of adjacent vertices. Typically, the multiple, and the unit value equal one.

The vertex vectors 310, 320, and 330 connect the center vertex 300 of the hexagon 260 with the first vertex 244 of the modulation triangle enclosing the reference vector 240. The "remainder vector" 340 is the vector enclosed by the modulation triangle and connecting the first vertex 244 with the reference vector 240.

In one embodiment, the set of vertex vectors 310, 320, and 330 are determined based on a set of nested hexagons 370, 360, and 350 enclosing the reference vector 240. Each nested hexagon 370, 360, or 350 corresponds to a specific level ranging from (n−1) to a second level, and centers at the vertex 302, 304, or 244 of the vertex vector 310, 320, or 330. More detailed description of this embodiment for determining the set of vertex vector is provided below.

In another embodiment, the set of vertex vectors are determined based on increase or decrease the difference between the reference and the vertex vector. For example, for each interaction, a set of possible vertex vectors is tested, and the vertex vector subtracted from the reference vector and resulting in a minimum subtracted vector is selected. In alternative embodiment, the selection of the set of vertex vector is arbitrarily until a magnitude of the subtracted vector is less than a magnitude of the vertex vector, i.e., the subtracted vector is the remainder vector.

The switching states at the vertices 302, 304, and 244 are determined 382 iteratively for each vertex vector 310, 320, and 330 in the set 391, starting from a current switching state of the inverter at the origin vertex 300. For each iteration, a corresponding phase of the current switching state is modified to produce a first switching state 392 of the inverter at the first vertex 244. For each iteration, a type of a modification and the corresponding phase is determined based on a function s of the angle φ of the corresponding vertex vector related to axis A 231, and the corresponding phase is increased or decreased by the unit value based on the type of the modification. In one embodiment, in accordance with the definition of the switching states in Equation (1), the unit value is selected as one. It is understood that the unit value can be selected as other values if the switching states are defined differently.

In some embodiments, the first switching state of the inverter at the first vertex is determined based on angles of vertex vectors in the set and a first mapping 395 between functions of the angles of vertex vectors and types of modification of the switching states. For example, in one embodiment, the function s of the angle φ of the corresponding vertex vector can be simply described as $$s = 3\phi/\pi, \quad (3)$$

where $0 \leq \phi < 2\pi$.

Typically, the modulation triangles are equilateral, and thus, the angle φ of the vertex vector is multiple of a minimum angle between two adjacent vertex vectors, such as of π/3. Accordingly, in some embodiments, the function of the angle of the vertex vector includes a ratio of the angle of vertex vector with the minimum angle between two adjacent vertex vectors. That ratio can be mapped to a type of modification of a switching state to produce the first mapping.

Figures 4A, 4B:
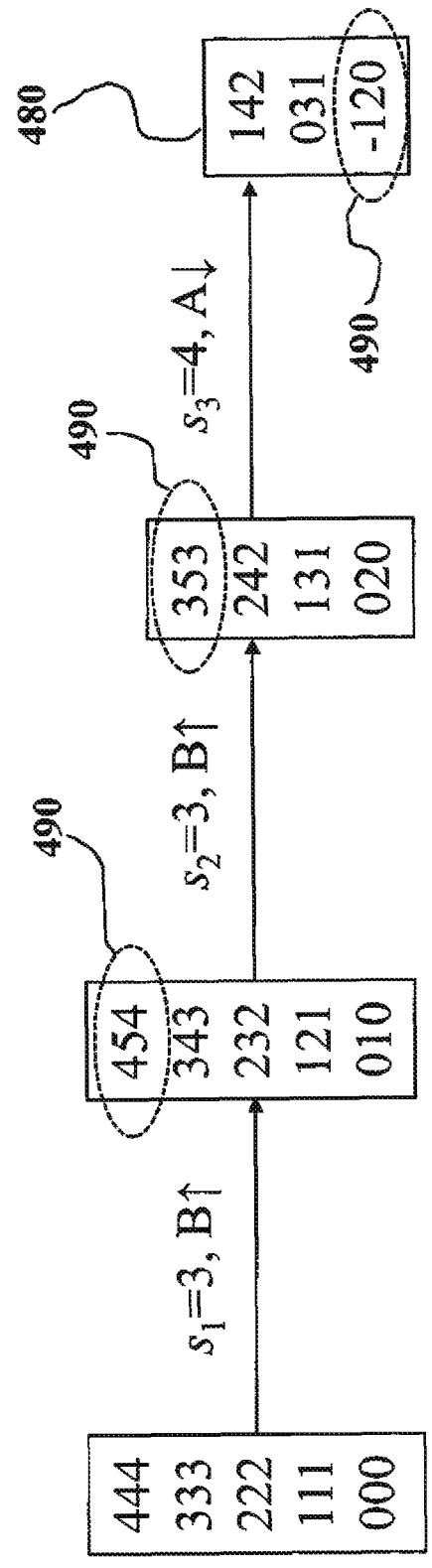
FIG. 4A is a schematic of calculation method of locating the reference vector of the invention according to some embodiments of the invention.
FIG. 4B is a schematic of illustration of applying the calculation method shown in FIG. 4A to locating the reference vector illustrated in FIG. 3A according to some embodiments of the invention.

FIG. 4A shows an example of the first mapping of the ratio determined by the function s to the type of modification that includes increase or decrease of a value of a phase of the switching state by a unit value. In FIG. 4A, the letters A, B, or C means the switching state of phase A, B, or C needs to be modified, respectively. The up-arrow "↑" means the switching state needs to increase by the unit value, e.g., by one, and the down-arrow "↓" means the switching state needs to decrease by one.

For example, if s=3, then the modification for the switching states is "B↑", which means the switching states at the current vertex need to increase by one for the switching state of phase B. Since the switching states for each phase of an n-level inverter can only value from 0 to (n−1) in the present invention, a modified switching state needs to be excluded when the corresponding switching state of phase A, B, or C is larger than (n−1) or less than zero.

Based on the first mapping of FIG. 4A, the switching states 480 at the first vertex 244 of the modulation triangle and the vertices 302 and 304 are shown in FIG. 3A and FIG. 4B, which can be verified by being compared with the space vector diagram shown in FIG. 2B. The invalid switching states 490, i.e., 454, 353, and −120 are excluded sequentially, as shown in FIG. 4B.

After the first switching state is determined, some embodiments determine a second switching state 393 of the inverter at a second vertex of the modulation triangle and a third switching state 394 of the inverter at a third vertex of the modulation triangle based on an angle of the remainder vector 340. Next, the inverter is modulated 386 based on the first, the second, and the third switching states. Some embodiments also determine duty cycles and the switching sequence of the inverter.

FIG. 3B shows a determination of the duty cycles and the switching sequence. The duty cycles can be determined using principles of a two-level inverter, because the remainder vector 340 is inside a hexagon 350 which is a space vector diagram of a two-level inverter. Determining the switching sequence means to determine the appropriate switching states of the inverter at a second vertex 242 and at a third vertex 246 of the modulation triangle and to select the appropriate sequence of the switching states at the vertices 242, 244, and 246.

There are two switching sequence modes used by embodiments, i.e., the switching sequence mode is mode=1 when the switching sequence is counterclockwise selected, and the switching sequence mode is mode=2 when the switching sequence is clockwise selected. In one embodiment, the switching sequence is determined based on the switching sequence mode and a function reg of the angle δ of the remainder vector 340 related to axis A 231, and the function reg of the angle δ can be described as $$3\delta/\pi < \text{reg} \leq 3\delta/\pi + 1 \quad (4)$$

where $0 \leq \delta < 2\pi$ and reg=1, 2, . . . 6. In some embodiments, the function reg is basically a region number of the modulation triangle nested in a second-level diagram based on the angle of the remainder vector.

For example, in one embodiment, a second switching state 393 of the inverter at a second vertex of the modulation triangle and a third switching state 394 of the inverter at a third vertex of the modulation triangle are determined based on the first switching state 392, the remainder vector 340 and a second mapping 396 of a function of an angle of the remainder vector, switching sequence modes, and the types of modification of the switching states.

FIG. 5A shows an example of the second mapping 396 in a tabular form. In this example of the second mapping, each element of the mapping includes five sub-elements. For example, "ABC↑(L)" when the function reg=1 and mode=1, and "ACB↓(U)" when reg=3 and mode=2. The letter A, B, or C means the switching state of phase A, B, or C to be modified sequentially. The symbol "↑" or "↓" means the state of the corresponding phase is modified by the unit value, e.g., increased by one or decreased by one, respectively.

In the space vector diagram, the redundant switching states at each vertex are listed decreasingly from top to bottom corresponding to the switching states of phase A, as shown in FIG. 2B. The letter "L" in the parentheses represents the word "lower" and means the first switching state at the first vertex 244 of the modulation triangle is not the top one, and the letter "U" in the parentheses represents the word "upper" and means the first switching state at the first vertex 244 of the modulation triangle is not the bottom one. As an example, for the remainder vector 340 shown in FIG. 3B, the value of reg is reg=2.

FIG. 5B shows the switching sequences according to different switching sequence modes determined based on the second mapping of FIG. 5A. The accuracy of the switching sequences can be verified based on space vector diagram of FIG. 2B. In some embodiments, the function reg of the remainder vector 340 is determined using digital signal processor implementation, as described below.

Figure 6:
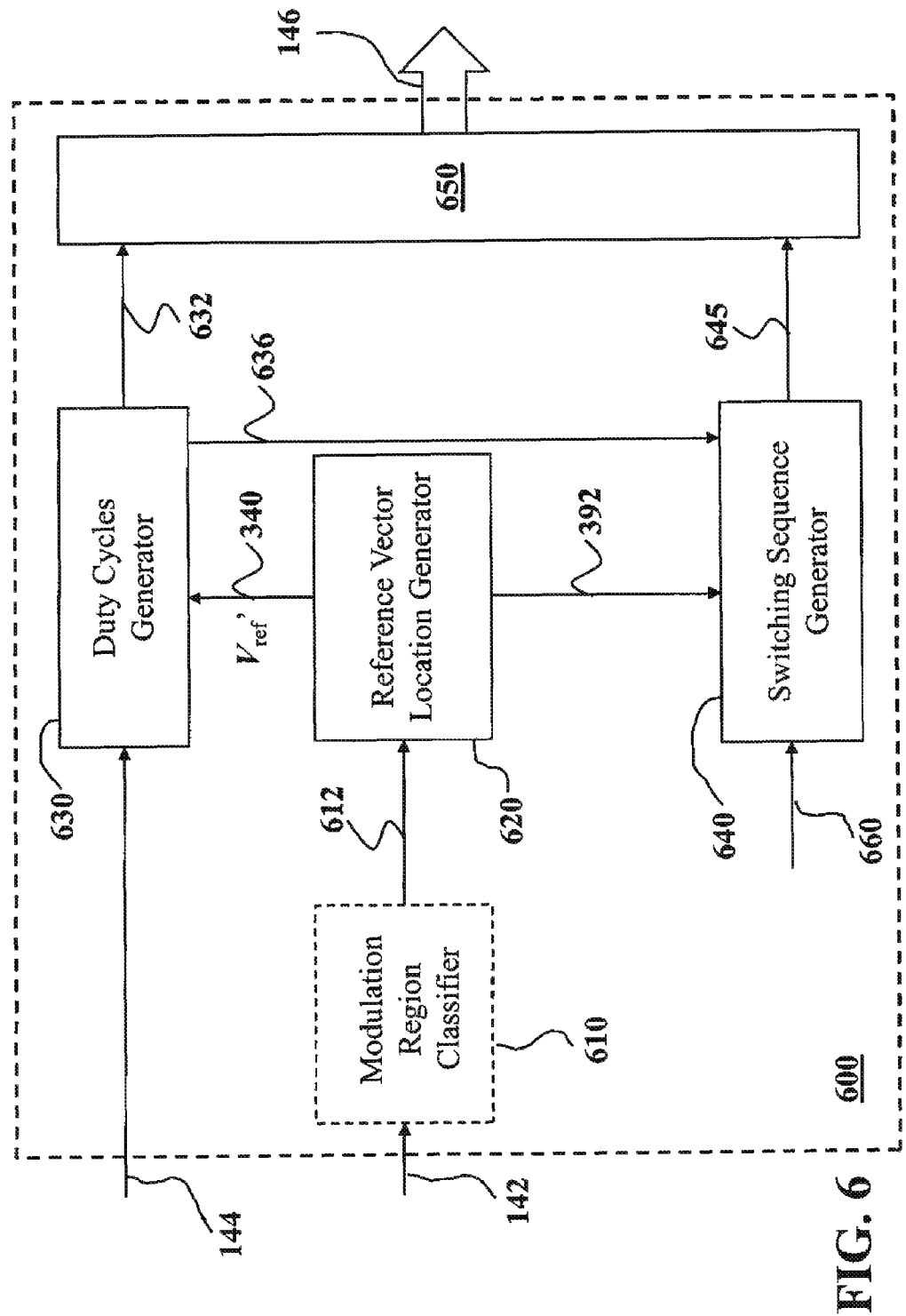
FIG. 6 is a block diagram of the space vector pulse width modulation controller according to some embodiments of the invention.

FIG. 6 shows a block diagram of the SVPWM controller 140 according to one embodiment of the invention. The SVPWM controller 140 of this embodiment can be implemented using a processor 600 and can include a modulation region classifier 610, a reference vector location generator 620, a duty cycles generator 630, and a switching sequence generator 640. Other embodiments of the invention can include more or less modules than embodiments of FIG. 6. For example, one embodiment does not include the modulation region classifier 610.

A command reference voltage 142 is at first classified and modified by the modulation region classifier 610 according to the magnitude of the command reference vector 142. The modulation region classifier 610 is enclosed by dashed line because the modulation region classifier 610 is a recommended option, and the modulation region classifier 610 is not necessary when the command reference voltage 142 is not in over-modulation region or in low-modulation region. The classified and modified reference vector 612 is then used by the reference vector location generator 620 to determine the remainder vector V'$_{ref}$ 340 and to determine the switching states 392 at the first vertex 244 of the modulation triangle.

Based on V'$_{ref}$ and the switching frequency 144, the duty cycles generator 630 determines the value 636 of function reg and the duty cycles 632. The switching sequence generator 640 then produces the switching sequence 645 according to the switching states at the first vertex 244 of the modulation triangle, the value of reg, and the selected switching sequence mode 660. Finally, the generated switching sequence and the obtained duty cycles are decoded by a decoder 650 according to, e.g., a method of FIG. 2C and sent to the inverter 120 as gate driving signals 146.

Classification of the Modulation Region

The command reference vector 142 for an n-level inverter is $$V_{ref} = (n-1) \cdot \left(V_a^* + V_b^* \cdot e^{j\frac{2}{3}\pi} + V_c^* \cdot e^{j\frac{4}{3}\pi}\right) = V_m \cdot e^{j\theta} = V_x + j \cdot V_y, \quad (5)$$

where $V_a^*$, $V_b^*$, and $V_c^*$ are the command reference voltage of phase A, B, and C, respectively. $V_m$ is the magnitude of the command reference vector 142, and $\theta$ is the phase angle of the command reference vector 142. $V_x$ and $V_y$ are real numbers and represent the real part and imaginary part of $V_{ref}$ 142, respectively.

In one embodiment, the command reference vector is at first classified into different modulation regions according to the magnitude of the reference vector by the modulation region classifier 610. For purposes of exemplifying the embodiment, the space vector diagram of the five-level inverter as shown in FIG. 2B is used as an example to illustrate the classification method.

Figure 7A:
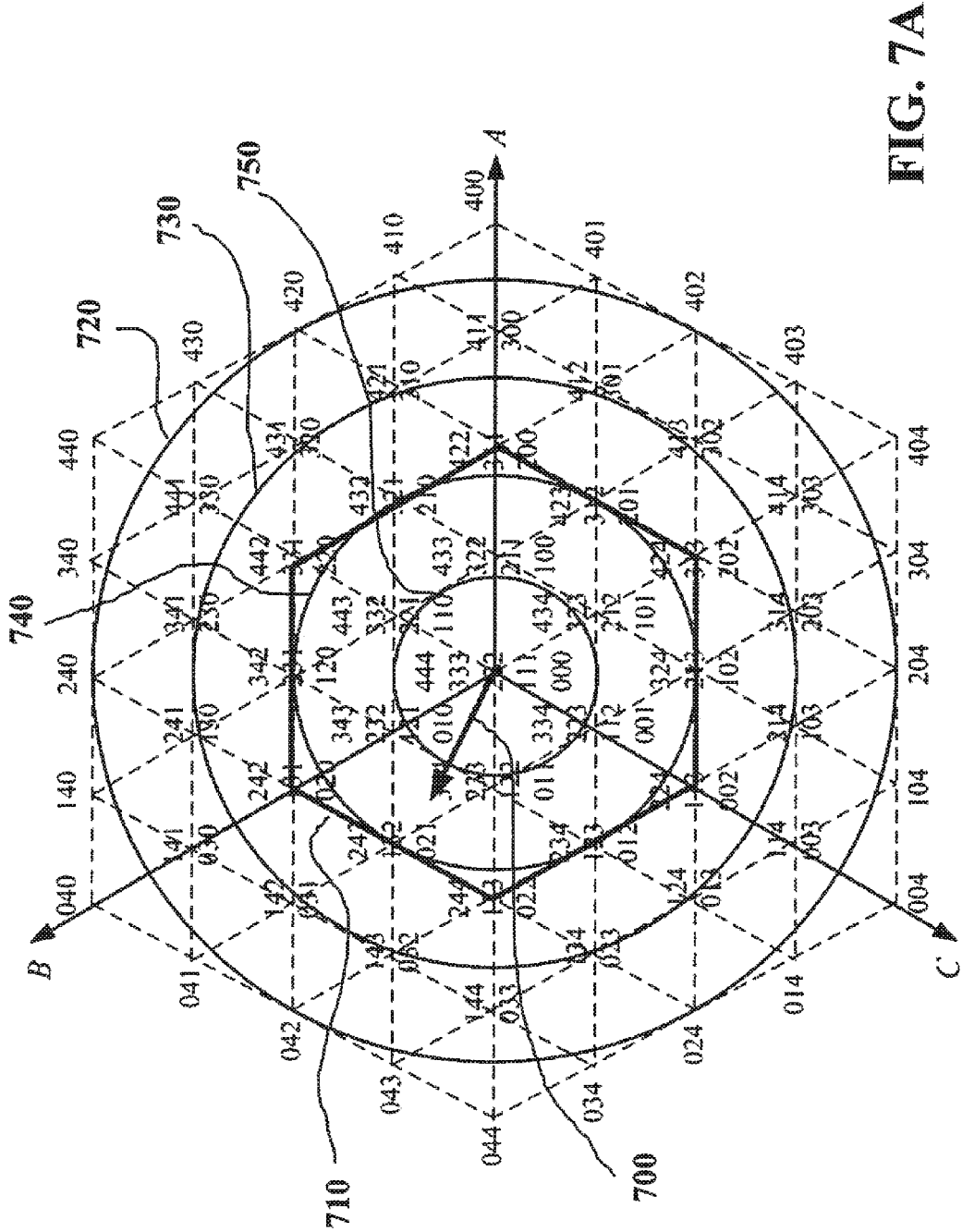
FIG. 7A is a schematic of classification method for the reference vectors according to some embodiments of the invention.

FIG. 7A shows an example of the classification method in the invention of one embodiment, in which the space vector diagram is partitioned into different regions by circles 720, 730, 740, and 750, whose centers all are the origin of the n-level space vector diagram. Each circle 720, 730, 740, or 750 is an inscribed circle of a hexagon, and the hexagon represents the space vector diagram of a certain level inverter. For example, the circle 740 is an inscribed circle of a hexagon 710, which is a space vector diagram of a three-level inverter.

For an n-level inverter, there are n regions as $$r = \begin{cases} n, & \text{if } V_m > \frac{\sqrt{3}}{2}V_{dc} \cdot (n-1); \\ n-1, & \text{else if } V_m > \frac{\sqrt{3}}{2}V_{dc} \cdot (n-2); \\ n-2, & \text{else if } V_m > \frac{\sqrt{3}}{2}V_{dc} \cdot (n-3); \\ \vdots \\ 1, & \text{else if } V_m \geq 0. \end{cases} \quad (6)$$

In some embodiments, the region is called "over-modulation region" when r=n; when r=n−1, the region is called "regular region;" when 0<r<n−1, the region is called "low-modulation region."

The modulation region classifier 610 can modify the reference vector $V_{ref}$ 142 according to the region that the reference vector $V_{ref}$ 142 lies in. Define the reference vector modified by the modulation region classifier as $$V_{ref0} = V_{m0} \cdot e^{j\theta_0} = V_{rx0} + j \cdot V_{ry0}, \quad (7)$$

where $V_{m0}$ is the magnitude of the modified reference vector $V_{ref0}$, and $\theta_0$ is the phase angle of the modified reference vector $V_{ref0}$. $V_{rx0}$ and $V_{ry0}$ are real numbers and represent the real part and imaginary part of $V_{ref0}$, respectively.

When the command reference vector $V_{ref}$ 142 is located in the "regular region," i.e., r=n−1, or the "low-modulation region", i.e., 0<r<n−1, the command reference vector $V_{ref}$ 142 does not need to be modified by the modulation region classifier 610, so $$V_{ref0} = V_{ref}, \quad (8)$$

and the values of $V_{m0}$, $\theta_0$, $V_{rx0}$, and $V_{ry0}$ can be obtained by Equation (7).

Figure 7B:
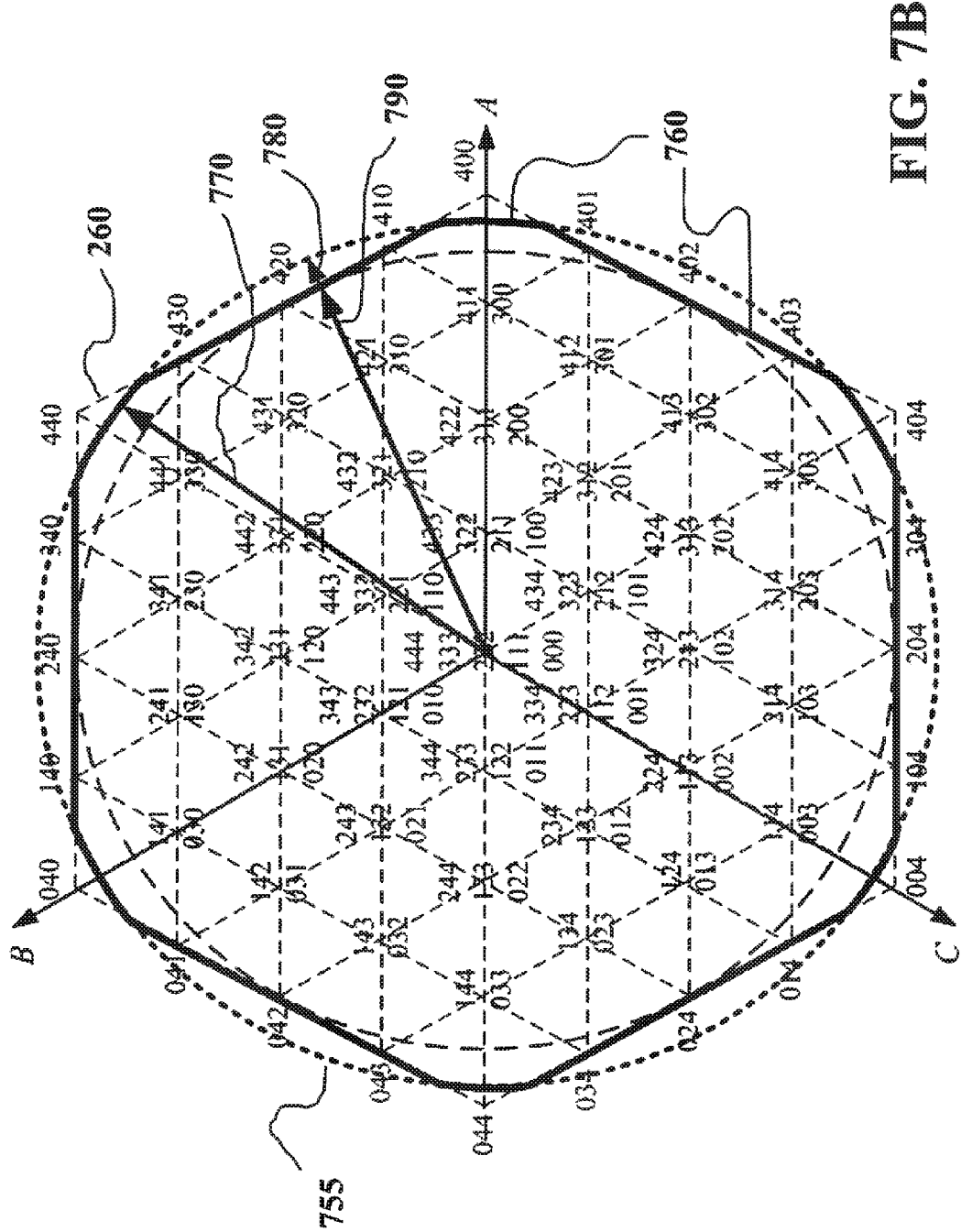
FIG. 7B is a schematic of adjustment for the reference vectors at over-modulation region according to some embodiments of the invention.

FIG. 7B shows an example of the reference vector $V_{ref}$ 142 located in the "over-modulation region", i.e., r=n, i.e., the command reference vector 142 is modified by the modulation region classifier 610. The circle 755 with the radius of $V_m$, i.e., the magnitude of the command reference vector $V_{ref}$ 142, and the circle 755 is the requested reference vector trajectory. Limited by the n-level space vector diagram, however, the real reference vector trajectory is drawn by bolded lines 760.

There are two possible locations of the command reference vector $V_{ref}$ 142. One possible location of $V_{ref}$ is that the command reference vector $V_{ref}$ is inside the n-level space vector diagram, e.g. the vector $V_{r1}$ 770, and in this condition $V_{r1}$ does not need to be modified by the modulation region classifier 610. The other possible location of $V_{ref}$ 142 is that the command reference vector $V_{ref}$ is outside the n-level space vector diagram, e.g. the vector $V_{r2}$ 780, and in this condition $V_{r2}$ needs to be modified to the vector $V_{r3}$ 790.

In one embodiment, the modified reference vector $V_{ref0}$ for the reference vector $V_{ref}$ locating in the "over-modulation region" is calculated as follows $$V_{ref0} = \begin{cases} \min\left(V_m, \frac{\frac{\sqrt{3}}{2}V_{dc} \cdot (n-1)}{\tan\left(\left|\theta - \frac{1}{6}\pi\right|\right)}\right) \cdot e^{j\theta}, & \text{if } \left(0 < \theta \leq \frac{1}{3}\pi\right); \\ \min\left(V_m, \frac{\frac{\sqrt{3}}{2}V_{dc} \cdot (n-1)}{\tan\left(\left|\theta - \frac{1}{2}\pi\right|\right)}\right) \cdot e^{j\theta}, & \text{else if } \left(\frac{1}{3}\pi < \theta \leq \frac{2}{3}\pi\right); \\ \min\left(V_m, \frac{\frac{\sqrt{3}}{2}V_{dc} \cdot (n-1)}{\tan\left(\left|\theta - \frac{5}{6}\pi\right|\right)}\right) \cdot e^{j\theta}, & \text{else if } \left(\frac{2}{3}\pi < \theta \leq \pi\right); \\ \min\left(V_m, \frac{\frac{\sqrt{3}}{2}V_{dc} \cdot (n-1)}{\tan\left(\left|\theta - \frac{7}{6}\pi\right|\right)}\right) \cdot e^{j\theta}, & \text{else if } \left(\pi < \theta \leq \frac{4}{3}\pi\right); \\ \min\left(V_m, \frac{\frac{\sqrt{3}}{2}V_{dc} \cdot (n-1)}{\tan\left(\left|\theta - \frac{3}{2}\pi\right|\right)}\right) \cdot e^{j\theta}, & \text{else if } \left(\frac{4}{3}\pi < \theta \leq \frac{5}{3}\pi\right); \\ \min\left(V_m, \frac{\frac{\sqrt{3}}{2}V_{dc} \cdot (n-1)}{\tan\left(\left|\theta - \frac{11}{6}\pi\right|\right)}\right) \cdot e^{j\theta}, & \text{else if } \left(\frac{5}{3}\pi < \theta \leq 2\pi\right). \end{cases} \quad (9)$$

where min(a, b) means the smaller one between a and b, |c| means the absolute value of c. Then the values of $V_{m0}$, $\theta_0$, $V_{rx0}$, and $V_{ry0}$ can be determined using Equation (7).

Determining Set of Vertex Vectors of Reference Vector

Determining the location of the reference vector includes determination of the switching states at the first vertex 244 of the modulation triangle of the command reference vector 142. Such determination can be treated differently by the reference vector location generator 620 according to the modulation region in. Equation (6) and the modified reference vector $V_{ref0}$ in Equation (8) or Equation (9) determined by the modulation region classifier 610.

Generally, if the modulation region of the command reference vector $V_{ref}$ 142 of the n-level inverter is r determined by Equation (6) and 0<r<n−1, i.e., then the command reference vector $V_{ref}$ is in the "low-modulation region," then the command reference vector $V_{ref}$ is treated as in a (r+1)-level space vector diagram instead of in a n-level space vector diagram by the reference vector location generator 620 of the invention. For example, the modulation region for the reference vector 700 shown in FIG. 7A is r=2<n−1, thus the reference vector 700 is in the low-modulation region and is treated as in a 3-level space vector diagram by the reference vector location generator 620 of the invention.

If the modulation region of the command reference vector $V_{ref}$ of the n-level inverter is r determined by Equation (6) and r=n−1, i.e., then the command reference vector $V_{ref}$ is in the "regular region", or r=n, i.e., the command reference vector $V_{ref}$ is in the "over-modulation region," then the command reference vector $V_{ref}$ is treated as in the n-level space vector diagram by the reference vector location generator 620 of the invention. The difference is that when the command reference vector $V_{ref}$ is locating in the "over-modulation region", i.e., r=n, the command reference vector $V_{ref}$ is modified by Equation (9). If the reference vector $V_{ref}$ is in the "over-modulation region" or the "regular region," then the modified reference vector $V_{ref0}$ is treated as in the n-level space vector diagram by the reference vector location generator 620.

Figure 8A:
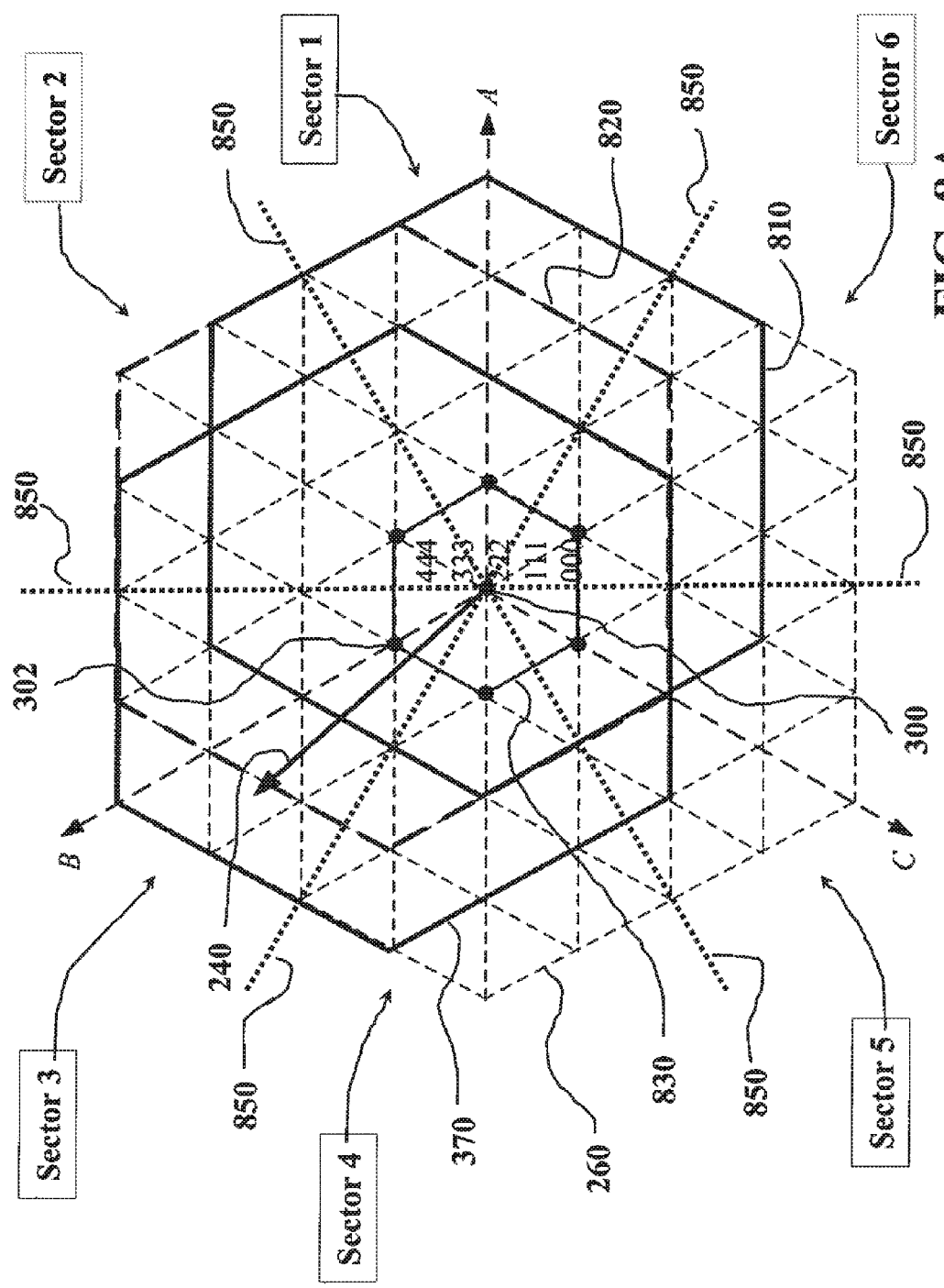
FIG. 8A-8C are schematics of steps for locating the reference vector according to some embodiments of the invention.
Figure 8B:
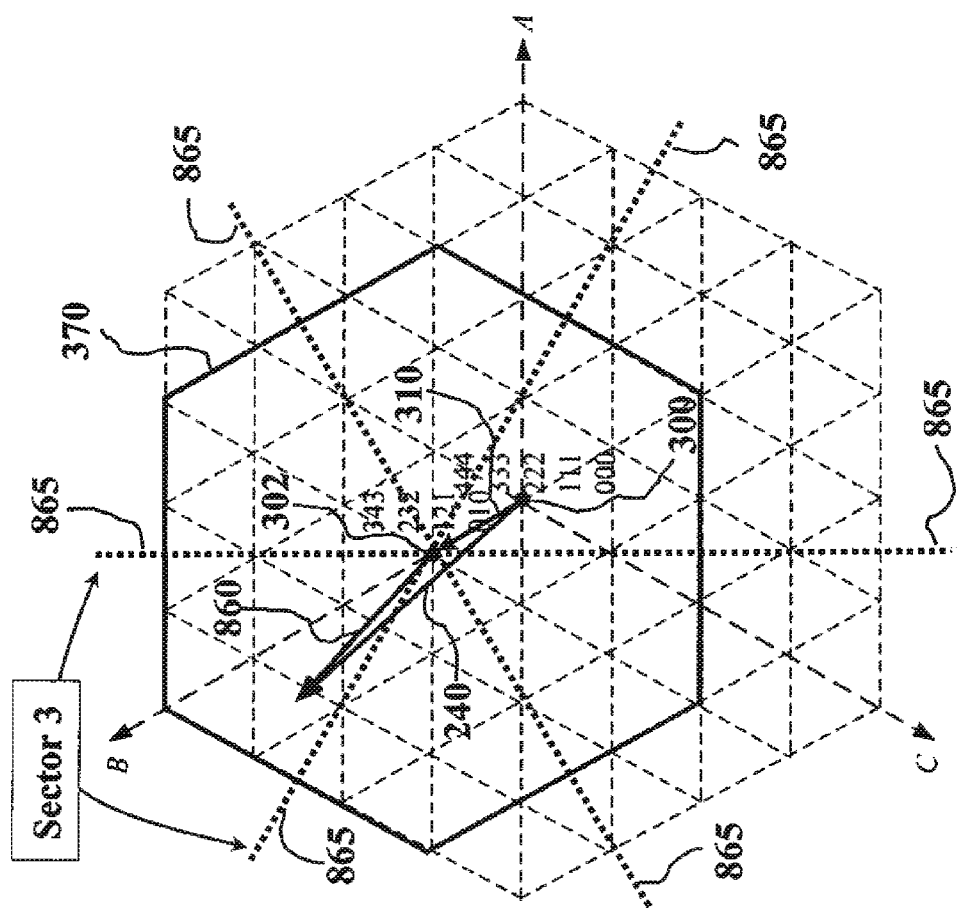
Figure 8C:
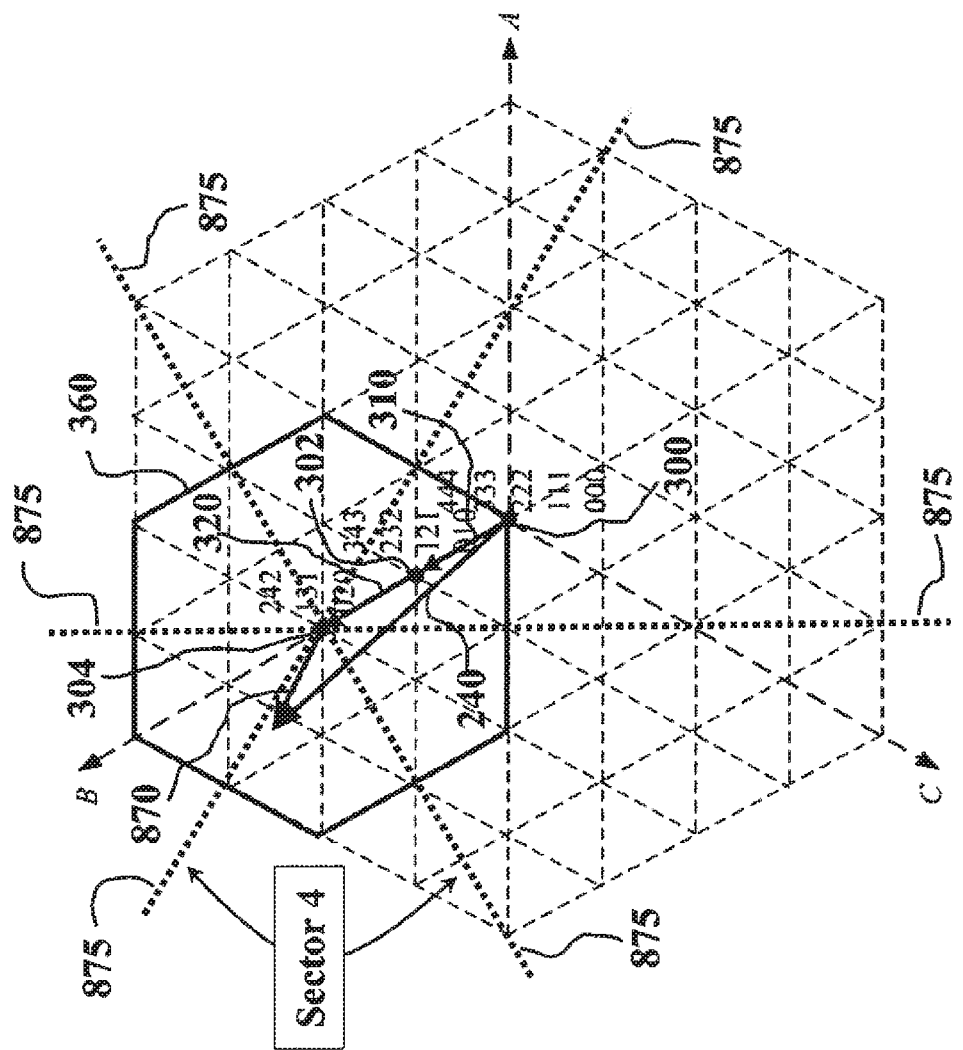

FIGS. 8A-C show an example of a method implemented by, e.g., the reference vector location generator 620, for determining the set of vertex vectors based on determining a set of nested hexagons 370, 360, and 350 enclosing the reference vector 240. For exemplifying purposes, the space vector diagram of the five-level inverter as shown in FIG. 2B is used in this example. It's understood that this method can be implemented in any level inverters.

The space-vector diagram of the n-level inverter is partitioned into six sectors by six dashed lines 850. The six dashed lines 850 pass through the center 300 of the n-level space-vector diagram and their angles are from π/6 to 11π/6, and the angle between any two adjacent dashed lines is π/3. Then consider the space-vector diagram of the n-level inverter as being composed of six hexagons that are the space-vector diagrams of (n−1)-level inverters. For clarity, only three hexagons 810, 820, and 370 of the six hexagons that are the space-vector diagrams of (n−1)-level inverters are shown in FIG. 8A.

The center vertices of the six (n−1)-level hexagons also form a hexagon 830, whose center vertex 300 is the center vertex 300 of the original n-level space-vector diagram. For each sector enclosed by two adjacent dash lines 850, the reference vector lying within is considered as only belonging to one of the six (n−1)-level hexagons. Number the six (n−1)-level hexagons from 1 to 6, and consider the $i^{th}$ (i=1, 2, ... 6) sector belonging to the $i^{th}$ (n−1)-level hexagon, whose center vertex is in the sector. If the order number of the (n−1)-level hexagon 370 that contains the reference vector 240 is $S_1$ ($S_1$=1, 2, ... 6), then the order number of the selected (n−1)-level hexagon 370, called the nested (n−1)-level hexagon 370, can be determined by the phase angle $\theta_0$ of the reference vector $V_{ref0}$ 240 as $$\frac{3}{\pi}\theta_0 + \frac{1}{2} \leq s_1 < \frac{3}{\pi}\theta_0 + \frac{3}{2}. \quad (10)$$

Some embodiments of the invention determine a set of nested hexagons enclosing the reference vector. Each nested hexagon corresponds to a specific level, wherein the specific level ranging from the level of the inverter to a second level inverter. Next, the set of vertex vectors sequentially connecting centers of the nested hexagons is determined. In those embodiments, the first vertex is a center vertex of the second level inverter.

For example, because the phase angle of the $V_{ref0}$ 240 shown in FIG. 8A is π/2<$\theta_0$<5π/6, the order number of the nested (n−1)-level hexagon 370 containing the $V_{ref0}$ 240 is $S_1$=3. The value of $S_1$ can also be determined by Equation (11)

$$s_1 = \begin{cases} 1, & \text{if } \left(V_{rx0} > 0 \text{ and } -\frac{\sqrt{3}}{3}V_{rx0} < V_{ry0} \leq \frac{\sqrt{3}}{3}V_{rx0}\right); \\ 2, & \text{else if } \left(V_{rx0} > 0 \text{ and } V_{ry0} > \frac{\sqrt{3}}{3}V_{rx0}\right) \text{ or} \\ & (V_{rx0} = 0 \text{ and } V_{ry0} > 0); \\ 3, & \text{else if } \left(V_{rx0} < 0 \text{ and } V_{ry0} > -\frac{\sqrt{3}}{3}V_{rx0}\right); \\ 4, & \text{else if } \left(V_{rx0} < 0 \text{ and } \frac{\sqrt{3}}{3}V_{rx0} \leq V_{ry0} < -\frac{\sqrt{3}}{3}V_{rx0}\right); \\ 5, & \text{else if } \left(V_{rx0} < 0 \text{ and } V_{ry0} < \frac{\sqrt{3}}{3}V_{rx0}\right); \\ 6, & \text{else} \end{cases} \quad (11)$$

where $V_{rx0}$ and $V_{ry0}$ represent the real part and imaginary part of $V_{ref0}$ 240, respectively. The value of $s_1$ is used to determine the switching states at the center vertex 302 of the nested (n−1)-level hexagon 370 according to the first mapping of FIG. 4A.

After the value of $s_1$ is determined, the origin of the reference vector 240 is changed to the center 302 of the nested (n−1)-level hexagon 370. This is achieved by subtracting the vertex vector 310 connecting the two center vertices 300 and 302 of the n-level hexagon 260 and the nested (n−1)-level hexagon 370 from the reference vector 240, as shown in FIG. 8B. Generally, the new reference voltage vector $V_{ref(1)}$ 860, called the subtracted reference vector 860, can be obtained as $$V_{ref(1)} = V_{ref0} - V_{dc} \cdot e^{\frac{j(s_1-1)\pi}{3}} = V_{m(1)} \cdot e^{j\theta_1} = V_{rx(1)} + j \cdot V_{ry(1)}, \quad (12)$$

where $V_{dc}$ is voltage of the DC source 110, $S_1$ represents the order number of the nested (n−1)-level hexagon 370, $V_{m(1)}$ and $\theta_1$ are the magnitude and phase angle of the subtracted reference vector $V_{ref(1)}$ 860. $V_{rx(1)}$ and $V_{ry(1)}$ are real numbers and represent the real part and imaginary part of $V_{ref(1)}$ 860, respectively.

With the subtracted reference vector $V_{ref(1)}$ 860, the nested (n−1)-level hexagon 370 can also be partitioned into six sectors by dashed lines 865 and is composed of six hexagons that are the space-vector diagrams of (n−2)-level inverters. Then, a new subtracted reference vector $V_{ref(2)}$ 870 and the order number $S_2$ of a nested (n−2)-level hexagon 360 can be determined. The processing is similar to the processing with the n-level space-vector diagram described above. Repeat the above processing, as shown in FIG. 8A to FIG. 8C, until the finally selected nested hexagon 350 becomes the space-vector diagram of a second-level inverter, as shown in FIG. 3A. Accordingly, a center vertex of the nested hexagon of the specific level is determined based on the angle of a subtracted reference vector connecting a center vertex of a closest higher-level nested hexagon and the reference vector.

There are totally (n−2) such steps for an n-level inverter, and after the $(k+1)^{th}$ step, k=1, 2, . . . n−3, the order number $S_{k+1}$ of the selected nested (n−k−1)-level hexagon and the subtracted reference vector $V_{ref(k+1)}$ are $$s_{k+1} = \begin{cases} 1, & \text{if } \left(V_{rx(k)} > 0 \text{ and } -\frac{\sqrt{3}}{3}V_{rx(k)} < V_{ry(k)} \leq \frac{\sqrt{3}}{3}V_{rx(k)}\right); \\ 2, & \text{else if } \left(V_{rx(k)} > 0 \text{ and } V_{ry(k)} > \frac{\sqrt{3}}{3}V_{rx(k)}\right) \text{ or } \\ & (V_{rx(k)} = 0 \text{ and } V_{ry(k)} > 0); \\ 3, & \text{else if } \left(V_{rx(k)} < 0 \text{ and } V_{ry(k)} \geq -\frac{\sqrt{3}}{3}V_{rx(k)}\right); \\ 4, & \text{else if } \left(V_{rx(k)} < 0 \text{ and } \frac{\sqrt{3}}{3}V_{rx(k)} \leq V_{ry(k)} < -\frac{\sqrt{3}}{3}V_{rx(k)}\right); \\ 5, & \text{else if } \left(V_{rx(k)} < 0 \text{ and } V_{ry(k)} < \frac{\sqrt{3}}{3}V_{rx(k)}\right); \\ 6, & \text{else.} \end{cases}$$ (13)

and $$V_{ref(k+1)} = \qquad (14)$$
$$V_{ref(k)} - V_{dc} \cdot e^{j(s_{k+1}-1)\pi/3} = V_{m(k+1)} \cdot e^{j\theta_{k+1}} = V_{rx(k+1)} + j \cdot V_{ry(k+1)}$$

where $V_{dc}$ is the voltage of the DC source 110, $V_{m(k+1)}$ and $\theta_{k+1}$ are the magnitude and phase angle of the subtracted reference vector $V_{ref(k+1)}$. $V_{rx(k+1)}$ and $V_{ry(k+1)}$ are real numbers and represent the real part and imaginary part of $V_{ref(k+1)}$, respectively.

At the final step, $V_{ref(n-2)}$ 340 is determined, and $V_{ref(n-2)}$ 340 can be decomposed into two vectors as with the second-level inverter, as shown in FIG. 3B. The nearest three vectors of the reference vector 240 are the vectors $V_{01}$ 242, $V_{02}$ 244, and $V_{03}$ 246, as shown in FIG. 2B. The detailed decomposition processing of $V_{ref(n-2)}$ 340 in the present invention is described below.

The subtracted reference vector at the final step, i.e., $V_{ref(n-2)}$ 340, is called the remainder vector 340 and is signed with $V'_{ref}$ as $$V'_{ref} = V_{ref(n-2)} = V_{dc} \cdot (V_{rx} + j \cdot V_{ry}) \qquad (15)$$

where $V_{rx}$ and $V_{ry}$ are real numbers and represent the real part and imaginary part of $V'_{ref}/V_{dc}$, respectively. The first vertex 244 of the modulation triangle is the center vertex 244 of the nested second-level hexagon 350 at the final step.

Figure 9A:
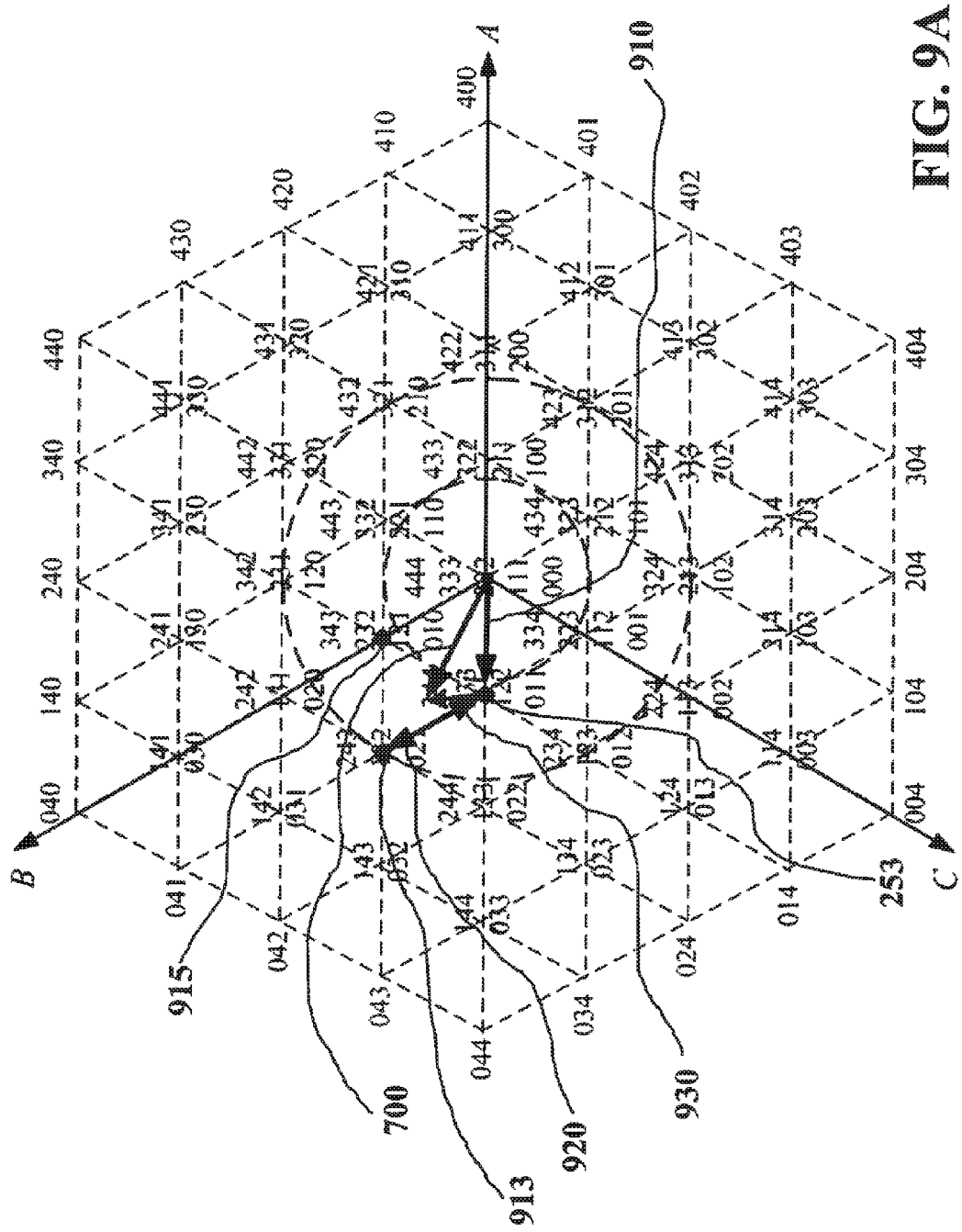
FIG. 9A is a schematic of the reference vector in the low-modulation region without applying the classification method of FIG. 7A.

FIG. 9A shows an example of the reference vector $V_{ref}$ locating in the "low-modulation region." The $V_{ref}$ still can be handled by the above-described method. For example, a reference vector $V_{f1}$ 700 is in the low-modulation region and the corresponding vertex vectors are 910, 920, and 930. The first vertex 253 of the modulation triangle of the reference vector $V_{f1}$ 700 can be determined as shown in FIG. 9A.

Figure 9B:
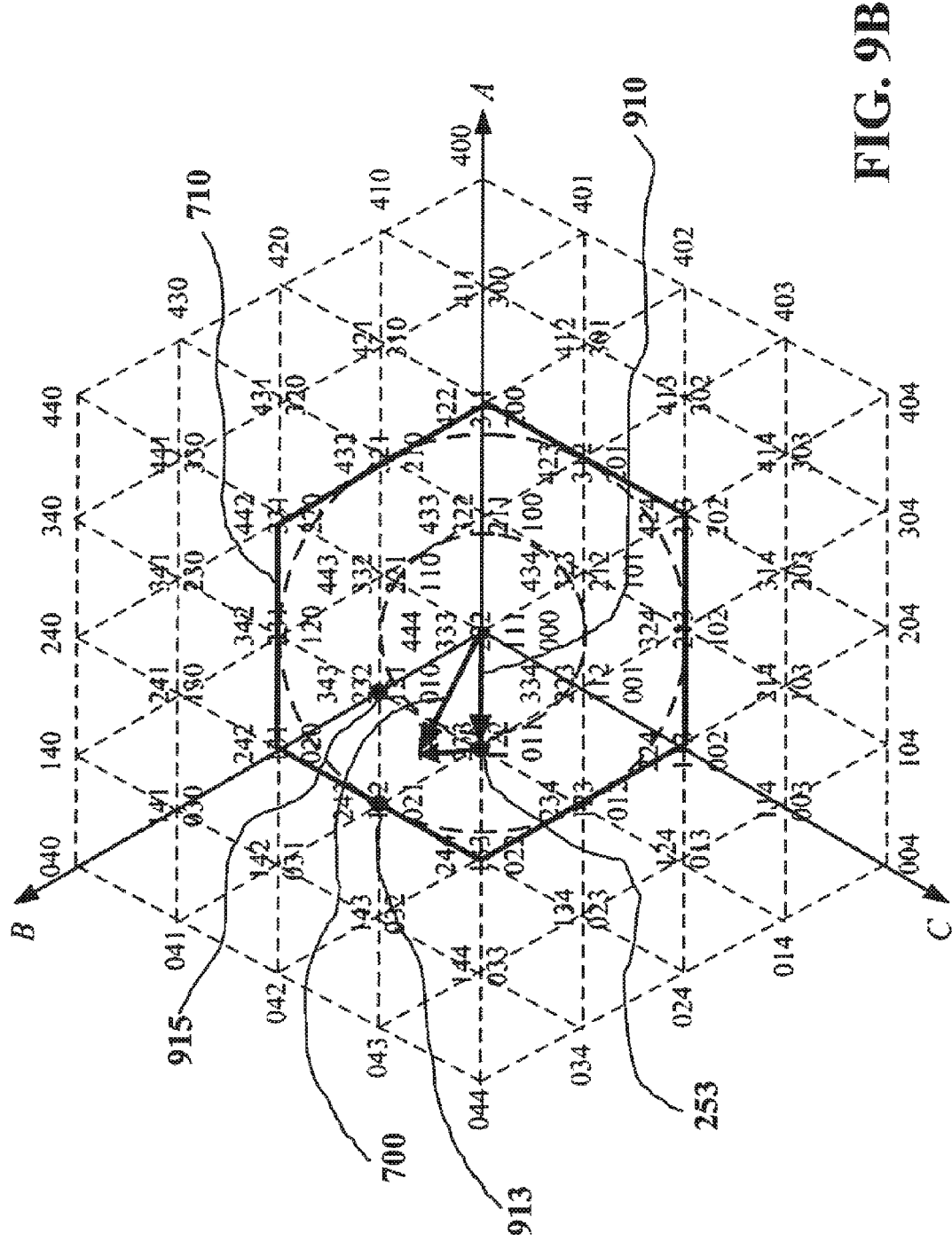
FIG. 9B is a schematic of the reference vector illustrated in FIG. 9A with applying the classification method of FIG. 7A according to some embodiments of the invention.

FIG. 9B shows an example of the method of another embodiment that handles the reference vector $V_{ref}$ locating in the "low-modulation region" in a more simplified way. According to the modulation region of the reference vector $V_{f1}$ 700 calculated in Equation (6) by the modulation region classifier 610, the reference vector $V_{f1}$ 700 is treated as in the 3-level space-vector diagram 710. The corresponding vertex vector is 910 as shown in FIG. 9B, and the number of the vertex vectors is reduced from three to one. The first vertex 253 of the modulation triangle of the reference vector $V_{f1}$ 700 is also determined by the embodiment of FIG. 9B.

Figure 9C:
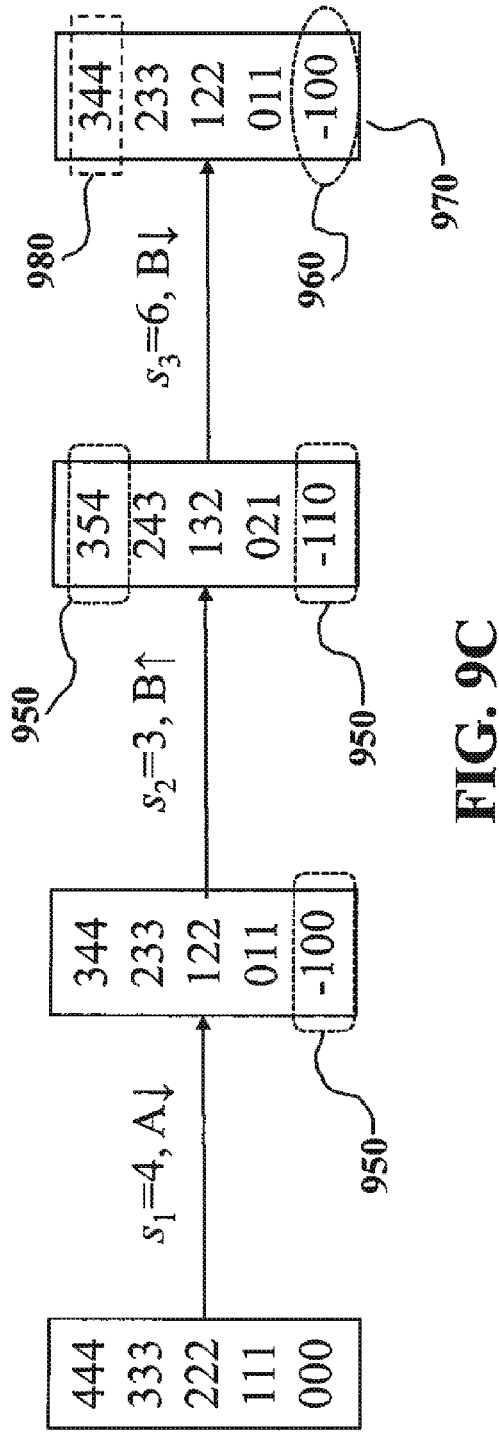
FIG. 9C is a schematic of locating the reference vector illustrated in FIG. 9A based on the calculation method of locating the reference vector shown in FIG. 4A according to some embodiments of the invention.
Figure 9D:
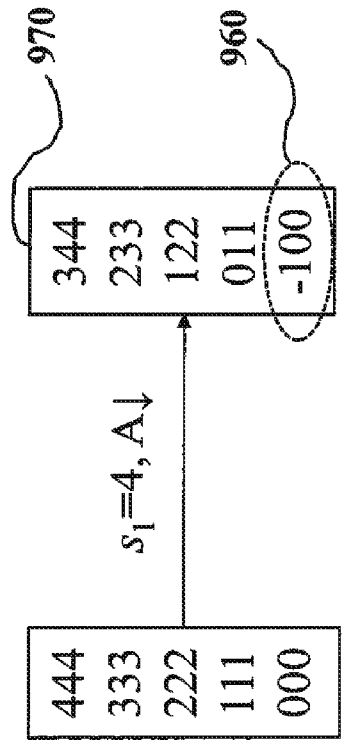
FIG. 9D is a schematic of locating the reference vector illustrated in FIG. 9B based on the calculation method of locating the reference vector shown in FIG. 4A according to some embodiments of the invention.

Based on the first mapping of switching states, the switching states 970 at the first vertex 253 of the modulation triangle of the reference vector $V_{f1}$ 700 according to FIG. 9A and FIG. 9B can be calculated as shown in FIG. 9C and FIG. 9D, respectively. The invalid switching state −100 960 is excluded at the final step in FIG. 9C and FIG. 9D, and the switching states 970 at the first vertex 253 of the modulation triangle can be verified by being compared with the switching states at the vertex 253 shown in FIG. 2B. When the modulation region classifier 610 is not adopted and the reference vector 700 is in the low-modulation region as in FIG. 9A, the invalid switching states 950 −100, 354, and −110 for the vertices 253 and 913 of the vertex vectors 910 and 920 are not excluded during the modification shown in FIG. 9C before the final step of the modification is implemented, and the invalid switching state −100 960 is excluded at the final step where the first vertex 253 of the modulation triangle is reached. However, if the modulation region classifier 610 of the present invention is adopted, then the invalid switching states 490 454, 353, and −120 and 960 −100 can be excluded sequentially during the modification, as shown in FIG. 4B and FIG. 9D, respectively. Because the number of both the vertex vectors and the switching states at the vertices of the vertex vectors is reduced by adopting the modulation region classifier 610 when the command reference vector $V_{ref}$ is locating in the low-modulation region, the modulation region classifier 610 decreases the processing time of the SVPWM.

Figure 10:
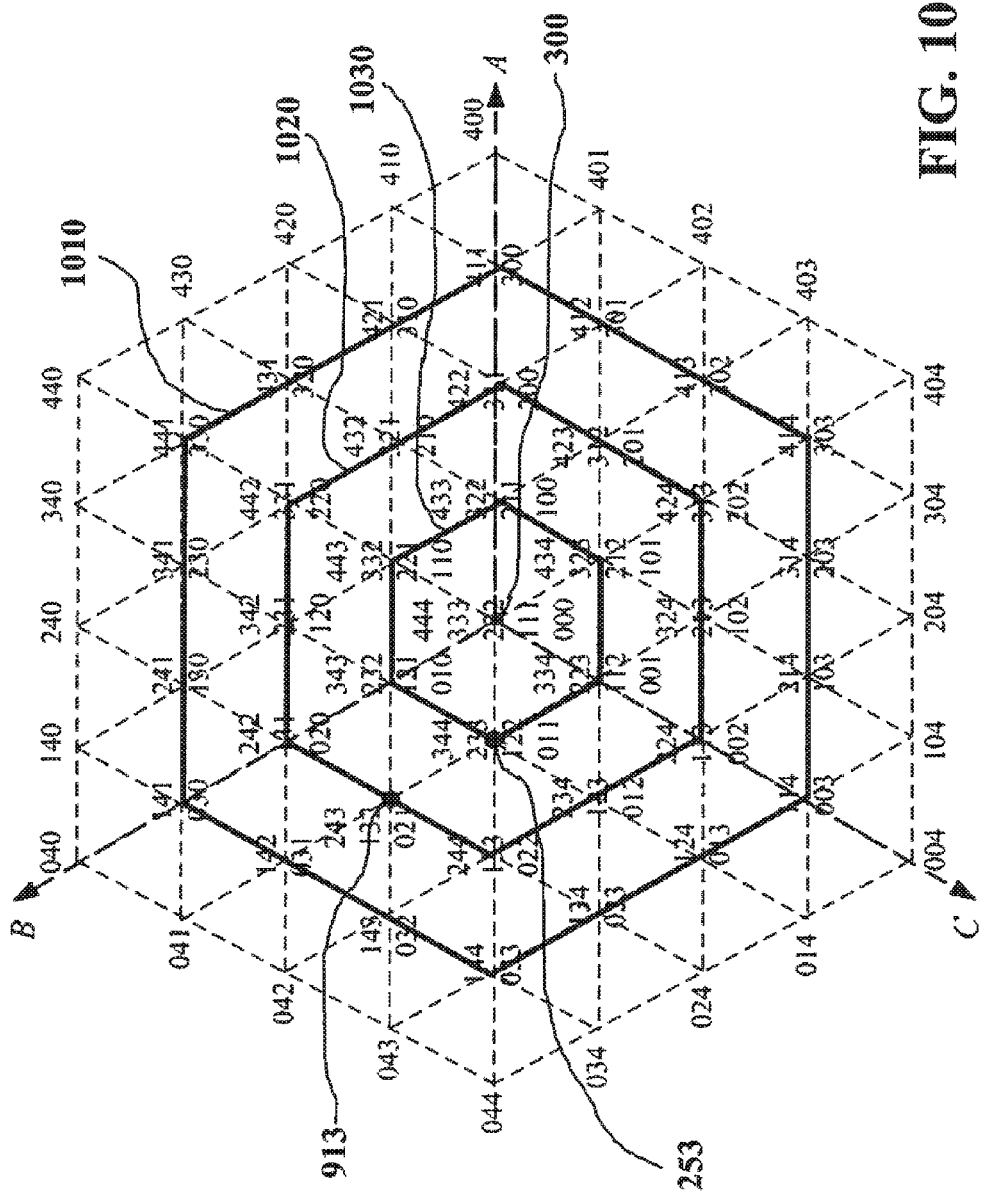
FIG. 10 is illustration of vertices of the origin of the remainder vector according to some embodiments of the invention.

FIG. 10 shows example of possible origins of the remainder vector $V'_{ref}$ as hexagons 1010, 1020, and 1030 and the center vertex 300 of the n-level space vector diagram that can be used by the modulation region classifier 610. The number of switching states at the vertices on the smaller hexagon can be larger than the number of switching states at the vertices on the bigger hexagon. For example, the vertex 253 is on the hexagon 1030 and the vertex 913 is on the bigger hexagon 1020, and the number of switching states at the vertex 253, i.e., four, is more than the number of switching states at the vertex 913, i.e., three. The reason why the invalid switching states 950 −100, 354, and −110 during the modification of switching states shown in FIG. 9C is not excluded can be explained as follows. Because the vertex vector 930 in FIG. 9A is from the vertex 913 to a vertex 253 with less switching states, i.e., the vertex vector 930 points from a bigger hexagon 1020 to smaller hexagon 1030, the valid switching state 344 980 in FIG. 9C is removed when the invalid switching state 354 950 is excluded during the modification, and thus all the switching states are retained until the final step of the modification. Because of the modulation region classifier 610, the vertex vectors of the reference vector does not point from a bigger hexagon to a smaller hexagon as the vertex vector 930 in FIG. 9A does, and the invalid switching states, e.g. 490 454, 353, and −120, can be excluded sequentially during the modification as in FIG. 4B.

The rational for the first mapping is based on Equation (14). The shift of the origin of the reference vector $V_{ref(k)}$ at the $(k+1)^{th}$ step is $V_{dc} \cdot e^{j(s_{k+1}-1)\pi/3}$, which is determined by the order number $S_{k+1}$ of the selected nested hexagon and can be substituted into Equation (1) to determine the required modification for the current switching states of phase A, B, or C.

Duty Cycles

Figures 11A, 11B:
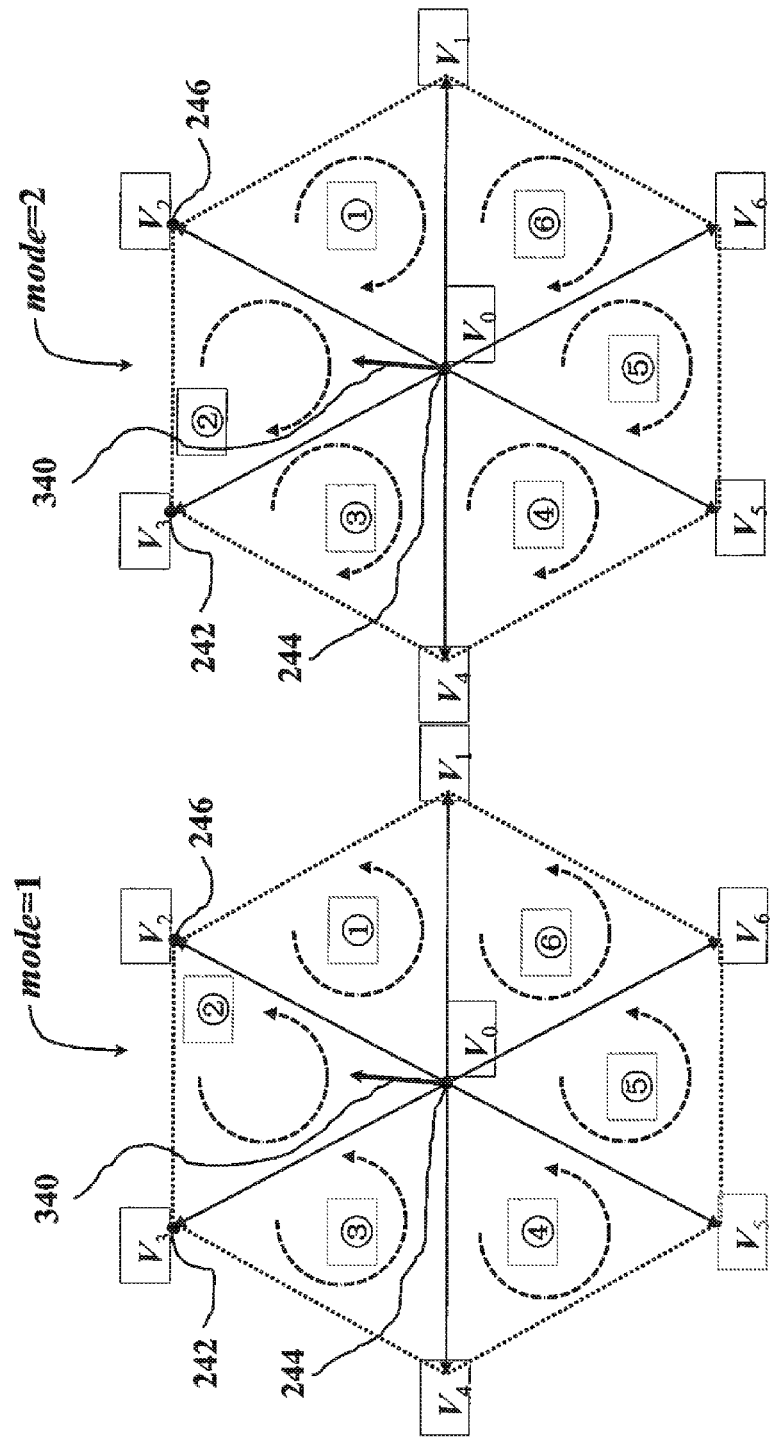
FIG. 11A-11B are illustration of switching sequence modes according to some embodiments of the invention.

Based on the remainder vector $V'_{ref}$, the duty cycles are determined in the similar way by the duty cycles generator 630, independent of the levels the inverter. As shown in FIG. 11A, any 2-level space vector diagram contains 6 vectors, $V_1$-$V_6$, and the corresponding duty cycles of these vectors are named as $T_1$-$T_6$. In the present invention, the 2-level space vector diagram is partitioned into 6 regions by those vectors, and each region is numbered with a value named reg, reg=1, 2, ... 6. The values of vectors $V_1$-$V_6$ are $$V_{reg} = V_{dc} \cdot e^{j \cdot (reg-1) \cdot \pi/3}, \text{reg}=1, 2, \ldots 6 \qquad (16)$$

The selection of the vectors and the calculation of the corresponding duty cycles are done by two steps. First, determine the region containing $V'_{ref}$ as follows:

$$reg = \begin{cases} 1, & \text{if } V_{rx} > 0 \text{ and } 0 < V_{ry} \leq \sqrt{3} V_{rx}; \\ 6, & \text{else if } V_{rx} > 0 \text{ and } -\sqrt{3} V_{rx} < V_{ry} \leq 0; \\ 3, & \text{else if } V_{rx} < 0 \text{ and } 0 < V_{ry} \leq -\sqrt{3} V_{rx}; \\ 4, & \text{else if } V_{rx} < 0 \text{ and } \sqrt{3} V_{rx} < V_{ry} \leq 0; \\ 2, & \text{else if } V_{ry} > 0; \\ 5, & \text{else}. \end{cases} \qquad (17)$$

Two vectors are selected as $V_{reg}$ and $V_{reg+1}$, when reg<6. When reg=6, those two vectors are $V_6$ and $V_1$. For example, if the remainder vector $V'_{ref}$ 340 is as shown in FIG. 11A, then the region number is reg=2, and $V_2$ and $V_3$ are the selected vectors.

After the region number reg is determined, the following equation is met:

$$T_s \cdot V'_{ref} = T_{reg} \cdot V_{reg} + T_{reg+1} \cdot V_{reg+1} = V_{dc} \cdot (T_3 \cdot e^{j \cdot (reg-1) \cdot \pi/3} + T_4 \cdot e^{j \cdot reg \cdot \pi/3}) \qquad (18)$$

where $T_s$ is the switching cycle and $T_s = 1/f_s$ where $f_s$ is the command switching frequency 144. When reg=6, $V_{reg+1}$ and $T_{reg+1}$ mean $V_1$ and $T_1$, respectively.

Then substitute Equation (15) into Equation (18) and the duty cycles can be determined as $$\begin{cases} T_{reg} = \frac{2}{\sqrt{3}} \left[ V_{rx} \sin\left(\frac{reg}{3}\pi\right) - V_{ry} \cos\left(\frac{reg}{3}\pi\right) \right] \cdot T_s \\ T_{reg+1} = -\frac{2}{\sqrt{3}} \left[ V_{rx} \sin\left(\frac{reg-1}{3}\pi\right) - V_{ry} \cos\left(\frac{reg-1}{3}\pi\right) \right] \cdot T_s \end{cases} \qquad (19)$$

For the vectors from the center vertex 300 of the n-level space vector diagram to the first vertex 244 of the modulation triangle of the reference vector 240, or called the "zero vectors" in the present invention, their total duty cycles are $$T_0 = T_s - T_{reg} - T_{reg+1}, \qquad (20)$$

where $T_s$ is the switching cycle as in Equation (18). For a multilevel inverter, there are usually no less than two switching states for the first vertex 244 of the modulation triangle, as shown in FIG. 3B. In the SVPWM method of some embodiments, two switching states, e.g., 142 and 031 as in FIG. 3B, for the first vertex 244 of the modulation triangle are used, and each switching state for the first vertex 244 of the modulation triangle represents a "zero vectors". The duty cycles of the "zero vectors" are $$\begin{cases} T_{01} = \beta \cdot T_0, 0 \leq \beta \leq 1 \\ T_{02} = (1-\beta) \cdot T_0. \end{cases} \qquad (21)$$

The duty cycles of the zero vectors can be adjusted by tuning the ratio β in Equation (21). Because different zero vectors can have different influence in the voltages of the DC link capacitors 112, 114, 116, and 118, the voltage balance of the DC link capacitors 112, 114, 116, and 118 can be controlled by tuning the ratio β in Equation (21).

Switching Sequence

FIGS. 11A-B show illustration of two switching sequence modes used by some embodiments of the invention. FIG. 11A shows an example where mode=1 and the switching sequence is counterclockwise selected. FIG. 11B shows an example where mode=2 and the switching sequence is clockwise selected. Based on the second mapping, as shown in FIG. 5A, the value of reg and the value of mode, the switching sequence can be determined by the switching sequence generator 640.

Take "ABC↑(L)" when reg=1 and mode=1 as an example to explain the switching sequence selection method in the present invention. Because reg=1, the vectors of the first sector, i.e., the vectors $V_1$ and $V_2$ are selected, and because mode=1, the switching sequence is $V_0 \rightarrow V_1 \rightarrow V_2 \rightarrow V_0$. From $V_0$ to $V_1$, the change of the vector is $V_{dc}$, which can be substituted into Equation (1) and means that the switching state of phase A increases by one. From $V_1$ to $V_2$, the change of the vector is $V_{dc} \cdot e^{j2\pi/3}$, which can be substituted into Equation (1) and means that the switching state of phase B increases by one. Similarly, from $V_2$ to $V_0$, the change of the vector is $V_{dc} \cdot e^{j4\pi/3}$, which means the switching state of phase C increases by one. All the switching sequences for other values of reg and mode can be analyzed in the similar way, and the rule of determining the switching sequence can be mapped as the second mapping.

Such mapping simplifies the determination of the switching states during the operation of the inverter, and can be used by inverter of any level, and for reference vector of any region. For example, if the reference vector $V_{ref}$ 1210 is located in the low-modulation region as shown in FIG. 12A, and 1220 and 1230 are the vertex vectors and 1240 is the remainder vector with the region number reg=5, then the switching sequence can be calculated as shown in FIG. 12B, which can be verified by being compared with the space vector diagram shown in FIG. 12A.

The rule of determining the switching sequence represented by the second mapping can also be extended to produce the switching sequence for other specific requirements. For example, in some applications, the switching sequence is preferred to be symmetric. In other words, if the original switching sequence is $V_0 \rightarrow V_1 \rightarrow V_2 \rightarrow V_0$, then the preferred switching sequence is $V_0 \rightarrow V_1 \rightarrow V_2 \rightarrow V_0 \rightarrow V_2 \rightarrow V_1 \rightarrow V_0$. The extended rule of determining the switching sequence for these applications is summarized in FIG. 13A, in which each element of the rule of determining the switching sequence is actually a combination of the two elements of the rule summarized in FIG. 5A according to the corresponding region number reg of the remainder vector. For example, when reg=1 and mode=1, the rule of determining the switching sequence is "ABC↑CBA↓(L)". As explained for the rule of determining the switching sequence shown in FIG. 5A, the letter "L" means the first switching state at the first vertex of the modulation triangle is not the top one; the next first three sequential switching states is generated according to the rule "ABC↑" as in FIG. 5A when reg=1 and mode=1, and the next second three sequential switching states is generated according to the rule "CBA↓" as in FIG. 5A when reg=1 and mode=2. Based on the rule of determining the switching sequence shown in FIG. 13A in the present invention, the switching sequences of the reference vector $V_{ref}$ 1210 shown in FIG. 12A according to different switching sequence modes are shown in FIG. 13B, and the switching sequences can be verified by being compared with the space vector diagram shown in FIG. 12A.

It can be seen from FIG. 12B and FIG. 13B that many switching sequences can be selected for some reference vectors, e.g., for the reference vector 1210 shown in FIG. 12A. Since different switching sequences can have different influence in the voltages of the DC link capacitors 112, 114, 116, and 118, the voltage balance of the DC link capacitors 112, 114, 116, and 118 can be controlled by selecting the appropriate switching sequences in the present invention.

The above-described embodiments of the present invention can be implemented in any of numerous ways. For example, the embodiments may be implemented using hardware, software or a combination thereof. When implemented in software, the software code can be executed on any suitable processor or collection, of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for space vector modulation of a multilevel inverter based on a space vector diagram of switching states of the inverter, wherein each switching state defines a combination of phases, wherein the space vector diagram includes a hexagon having a size proportional to a level of the inverter, the hexagon includes a set of vertices uniformly spaced to partition the hexagon into a set of modulation triangles, wherein sides of each modulation triangle are formed by vertex vectors connecting corresponding vertices, wherein the switching states of adjacent vertices are different by a unit value of the phase determined by an angle of the vertex vector connecting the adjacent vertices, the method comprising:

representing a reference vector as a sum of a remainder vector and a set of vertex vectors connecting a center vertex of the hexagon with a first vertex of the modulation triangle enclosing the reference vector, wherein the remainder vector connects the first vertex with the reference vector;

modifying iteratively, for each vertex vector in the set, starting from a current switching state of the inverter at the center vertex, a corresponding phase of the current switching state to produce a first switching state of the inverter at the first vertex, wherein, for each iteration, a type of the modification and the corresponding phase is determined based on a function of the angle of the corresponding vertex vector, and the corresponding phase is increased or decreased by the unit value based on the type of the modification;

determining a second switching state of the inverter at a second vertex of the modulation triangle and a third switching state of the inverter at a third vertex of the modulation triangle based on an angle of the remainder vector; and modulating the inverter based on the first, the second, and the third switching states.

2. The method of claim 1, further comprising:

reducing a size of the hexagon of the space vector diagram to circumscribe the reference vector ending in a low-modulation region.

3. The method of claim 1, further comprising:
reducing a magnitude of the reference vector ending in an over-modulation region to fit the hexagon of the space vector.

4. The method of claim 1, further comprising:
determining a set of nested hexagons enclosing the reference vector, wherein each nested hexagon corresponds to a specific level, wherein the specific level ranging from the level of the inverter to a second level inverter; and
determining the set of vertex vectors sequentially connecting centers of the nested hexagons, such that the first vertex is a center vertex of the second level inverter.

5. The method of claim 4, further comprising:
determining a center vertex of the nested hexagon of the specific level based on the angle of a subtracted reference vector connecting a center vertex of a closest higher-level nested hexagon and the reference vector.

6. The method of claim 5, further comprising:
partitioning the higher-level nested hexagon into a set of sectors;
determining a sector from the set of sector including the subtracted reference vector; and
selecting the center vertex of the nested hexagon located in the sector.

7. The method of claim 6, further comprising:
assigning an order number to each sector in the set of sector;
associating the type of the modification and the corresponding phase to be modified with the order number of the sector; and
determining the order number based on the angle of the subtracted reference vector to produce the switching state corresponding to the center vertex of the nested hexagon.

8. The method of claim 7, wherein the angle of the subtracted reference vector $\gamma$, further comprising:
determining the order number N according to $3\gamma/\pi + 0.5 \leq N < 3\gamma/\pi + 1.5$.

9. The method of claim 1, further comprising:
determining a duty cycle based on a decomposition of the remainder vector into vertex vectors originated from the first vertex.

10. The method of claim 1, further comprising:
determining a region number of the modulation triangle nested in a second-level diagram based on the angle of the remainder vector; and
determining the second switching state at the second vertex and the third switching state at the third vertex based on the region number and a switching sequence mode.

11. The method of claim 10, further comprising:
determining the corresponding phase and the type of the modification based on the region number and the switching sequence mode; and
modifying the corresponding phase of the first switching state by the unit value according to the type of the modification to determine the second switching state.

12. A method for a space vector modulation of a multi-level inverter based on a space vector diagram of switching states of the inverter, comprising:
representing a reference vector as a sum of a remainder vector connecting the reference vector with a first vertex of a modulation triangle enclosing the reference vector and a set of vertex vectors connecting a center vertex of the space vector diagram with the first vertex; determining a first switching state of the inverter at the first vertex based on angles of vertex vectors in the set and a first mapping between functions of the angles of vertex vectors and types of modification of the switching states; determining a second switching state of the inverter at a second vertex of the modulation triangle and a third switching state of the inverter at a third vertex of the modulation triangle based on the first switching state, the remainder vector and a second mapping of a function of an angle of the remainder vector, switching sequence modes, and the types of modification of the switching states; and modulating the inverter based on the first, the second, and the third switching states; wherein the function of the angle of the vertex vector includes a ratio of the angle of vertex vector with a minimum angle between two adjacent vertex vectors, further comprising:
mapping the ratio to a type of modification of a switching state to produce the first mapping, wherein the type of modification includes increase or decrease of a value of a phase of the switching state by a unit value.

13. The method of claim 12, wherein the function of the angle of the remainder vector determines a region number of the modulation triangle nested in a second-level diagram based on the angle of the remainder vector, further comprising:
mapping the region number to the type of modification of the switching state according to a switching sequence mode to produce the second mapping.

14. The method of claim 13, wherein the second mapping represents a symmetric switching sequence.

* * * * *